US012163436B1

(12) United States Patent
Kanoffsky et al.

(10) Patent No.: US 12,163,436 B1
(45) Date of Patent: Dec. 10, 2024

(54) GUIDE BLADE FOR A GUIDE DEVICE

(71) Applicant: BorgWarner Inc., Auburn Hills, MI (US)

(72) Inventors: Nico Kanoffsky, Bolanden (DE); Thomas Ramb, Worms (DE); Georg Scholz, Woellstein (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/379,271

(22) Filed: Oct. 12, 2023

(30) Foreign Application Priority Data

Aug. 10, 2023 (DE) ..................... 10 2023 121 472.1

(51) Int. Cl.
*F01D 17/16* (2006.01)
*F01D 5/14* (2006.01)
*F02B 37/24* (2006.01)

(52) U.S. Cl.
CPC ........... *F01D 17/165* (2013.01); *F01D 5/141* (2013.01); *F02B 37/24* (2013.01); *F05D 2220/40* (2013.01)

(58) Field of Classification Search
CPC ........ F01D 17/165; F01D 5/141; F02B 37/24; F05D 2220/40
See application file for complete search history.

(56) References Cited

U.S. PATENT DOCUMENTS 10,808,569 B2 10/2020 Boening et al.
2008/0260528 A1* 10/2008 Weber .................. F01D 17/165 415/208.2
2012/0177482 A1* 7/2012 Boening ............... F01D 17/165 415/163
2015/0104296 A1 4/2015 Yokoyama et al.
2022/0074314 A1* 3/2022 Biswas ................... F01D 25/24

FOREIGN PATENT DOCUMENTS

DE 102009006209 A1 8/2010
DE 102013225642 A1 6/2015

OTHER PUBLICATIONS

German Search Report issued on Feb. 29, 2024, in German Application No. DE 10 2023 121 472.1.

* cited by examiner

*Primary Examiner* — Brandon D Lee
(74) *Attorney, Agent, or Firm* — Eric L. Doyle; Stephan A. Pendorf; Patent Central LLC

(57) ABSTRACT

A guide blade (200) for a guide device (100), including a guide blade body (201) with a blade top side (210), a blade underside (220), a blade leading edge (230) and a blade trailing edge (240). The guide blade (200) also comprises a profile centerline (250) which is defined in a profile of the guide blade body (201) by the blade top side (210) and the blade underside (220) and runs between them from the blade leading edge (230) to the blade trailing edge (240), the profile centerline (250) having a turning point (IP). The blade leading edge (230) and the blade trailing edge (240) are connected by a profile chord (260). The guide blade (200) has a guide blade axis of rotation (PA). The axis of rotation (PA), starting from the blade leading edge (230) in the direction of the blade trailing edge (240), lies along the profile chord (260) between the blade leading edge (230) and the turning point (IP).

19 Claims, 10 Drawing Sheets

GUIDE BLADE FOR A GUIDE DEVICE

TECHNICAL FIELD

The present invention relates to a guide blade for a guide device, in particular for a variable turbine geometry, a variable turbine geometry for a turbine having at least one such guide blade, a turbine for a supercharging device having such a guide device, a supercharging device for an internal combustion engine or a fuel cell having such a turbine, and an engine system with such a supercharging device.

BACKGROUND

Ever-increasing numbers of vehicles of the newer generation are being equipped with supercharging devices in order to achieve the required aims and satisfy legal regulations. In the development of supercharging devices, it is the aim to optimize the individual components and the system as a whole with regard to their reliability and efficiency.

Known supercharging devices normally have at least one compressor with a compressor wheel which is connected to a drive unit via a common shaft. The compressor compresses the fresh air that is drawn in for an internal combustion engine or for a fuel cell. In this way, the air or oxygen quantity that is available to the engine for combustion or to the fuel cell for reaction, respectively, is increased. This in turn leads to an increase in performance of the internal combustion engine or of the fuel cell respectively. Supercharging devices may be equipped with different drive units. In particular, electric superchargers, in the case of which the compressor is driven by means of an electric motor, and turbochargers, in the case of which the compressor is driven by means of a turbine, in particular a radial turbine, are known in the prior art. By contrast to an axial turbine (as are provided for example in aircraft engines), in which there is a substantially exclusively axial incident flow, it is the case in a radial turbine that the exhaust-gas flow is conducted substantially radially, and in the case of a mixed-flow radial turbine semi-radially, that is to say with at least a small axial component, from a spiral-shaped turbine inlet onto the turbine wheel. Aside from electric superchargers and turbochargers, combinations of both systems are described in the prior art, these also being referred to as E-turbos.

In current developments of internal combustion engines in combination with supercharging devices, it is important to provide a high degree of efficiency of the turbine, the supercharging device and/or the internal combustion engine with low emissions, in particular of nitrogen oxide and soot. Known internal combustion engines have a plurality of cylinders, which can be fired sequentially. The cylinders have outlet ducts which can be opened at different times by means of sequential firing. If only one exhaust manifold is used, with which the exhaust gas is supplied to the turbine, pressure pulses during the expulsion of the exhaust gas as a result of the opening of outlet valves may adversely affect those cylinders in a charge change, in which the outlet valves are in the closing process—and ultimately may push back hot exhaust gas into these cylinders. This can lead to an increase in a knocking tendency and/or to a reduction of a fresh gas charging mass. In order to reduce or eliminate the above-mentioned problems, new concepts of turbine housings may have two inlet ducts with two tongues, which are circumferentially spaced apart from one another and in each case supply fluid (in particular an exhaust gas mass flow) to the turbine wheel. These new concepts of turbine housings may comprise two volutes or spirals, also known as the DualVolute concept, or a single volute or spiral, also known as the MonoVolute concept. In the DualVolute concept, fluid is in each case supplied to the turbine wheel over a certain circumferential range using the volute geometry; mixing of fluid upstream of the turbine wheel is reduced. In the Mono Volute concept, both inlet ducts lead into the single volute or spiral, with fluid from both ducts being able already to mix upstream of the turbine wheel. Such turbine housings have proven advantageous in particular when using the supercharging device together with an internal combustion engine (e.g. a gasoline engine or a diesel engine). Each inlet duct can be connected to a group of cylinders (i.e. with a plurality of cylinders) of the internal combustion engine, and thereby increase the efficiency of the internal combustion engine as well as the turbine, since interactions of individual cylinders can be reduced by separate supply to the turbine housing and high pressure pulses can be supplied to the turbine wheel more frequently. This improved technique for applying exhaust gas to the turbine wheel may also be referred to as pulse charging. However, in these turbine housings, in conjunction with the respective cylinder groups, exhaust gas mass flows between the volutes can occur and thus an increased pressure level downstream of the respective cylinders during operation of the internal combustion engine. In addition, these turbine housings can often cause a deterioration in the incident flow to the turbine wheel and thus a lower efficiency of the turbine.

In order to further increase the efficiency of turbines and adapt them to different operating points, modern supercharging devices are equipped with a power setting device, which can be used to adjust or change the power generation of the supercharging device. Known power setting devices are, for example, guide devices such as a variable turbine geometry (VTG) or a wastegate flap (WG). A guide device, in particular a variable turbine geometry, is an adjustable guide apparatus for changing an inflow to a turbine wheel of the turbine. By changing the inflow (e.g. the flow cross section and the incident-flow angle), in particular, the flow velocity of the exhaust gas flow supplied to the turbine wheel can be changed, which leads to a corresponding change in the power of the supercharging device. Such systems are also known as variable guide blades, VTG, guide grates or VTG guide grates.

Known guide devices, such as variable turbine geometries, frequently have a blade bearing ring with a multiplicity of adjustable guide blades which are mounted in a circle in said blade bearing ring and are each adjustable from a substantially tangential position with respect to the circle into an approximately radial position or more radial position. The adjustable guide blades are usually coupled via adjustment levers to an adjusting ring, which is arranged coaxially with the blade bearing ring. The guide blades can be adjusted and the inflow to the turbine wheel changed by a movement of the adjusting ring, for example a rotation in the circumferential direction. The rotation of the adjusting ring in the circumferential direction is provided by an actuating device. In particular, the actuating device is provided for generating control movements via the adjusting ring to be transferred to the guide device. The actuating device commonly has an actuator that is coupled via an adjusting shaft arrangement to the adjusting ring. For the mechanical coupling of the actuating device to the adjusting ring, an engagement of an inner lever with an actuation pin of the adjusting ring is commonly provided. The large number of movable individual parts of the guide device, in particular of the variable turbine geometry, commonly requires a complex and expensive assembly process and can lead to wear problems during operation.

Wear problems can often occur on the adjusting ring and on the adjusting levers due to the interaction of the components during the adjustment, as well as due to pulsating exhaust gas forces and their transmission via the guide blades and the blade levers to the point of engagement. This can result in damage to the adjusting ring and to the adjusting levers, as well as to a reduced service life of the guide device (e.g. of the variable turbine geometry) or the turbine and/or supercharging device in which the guide device is used. The new concepts of turbine housings described above can result in higher pulsation forces and excitations being transferred to the components of the guide device by the fluid flow. In particular, the excitations and pulsation forces are absorbed by the guide blades and transferred, for example, to the contact points between the blade lever and the adjusting ring, which can lead to higher wear between these components and thus to a lower running performance. If the components are designed more robustly, this can often lead to a larger required installation space, to greater required actuating forces (for adjusting the adjusting ring and thus the guide blades) and thus to a larger dimensioning of actuating devices. This can also lead to higher costs and to a greater weight. It has proven to be a challenge to find a satisfactory compromise between wear reduction and component dimensioning.

It is the object of the present invention to provide an improved guide blade for a guide device, in particular a variable turbine geometry, and in particular to provide an improved guide blade, by which wear of further components of a guide device can be reduced.

SUMMARY OF THE INVENTION

The present invention relates to a guide blade for a guide device, in particular a variable turbine geometry, as claimed in claim 1. The invention also relates to a guide device, in particular a variable turbine geometry, for a turbine as claimed in claim 12 having such a guide blade. Furthermore, the invention relates to a turbine for a supercharging device as claimed in claim 14 with such a guide device. In addition, the invention relates to a supercharging device for an internal combustion engine or a fuel cell as claimed in claim 15 with such a turbine, and to an engine system as claimed in claim 16 with such a supercharging device. The dependent claims describe advantageous embodiments of the guide blade, the guide device, the turbine, the supercharging device and the engine system.

According to a first aspect of the present invention, a guide blade for a guide device, in particular for a variable turbine geometry, comprises a guide blade body with a blade top side, a blade underside, a blade leading edge and a blade trailing edge. Furthermore, the guide blade comprises a profile centerline which is defined in a profile of the guide blade body by the blade top side and the blade underside and runs between them from the blade leading edge to the blade trailing edge. The profile centerline has a turning point. The blade leading edge and the blade trailing edge are connected by a profile chord. The guide blade has a guide blade axis of rotation, wherein the axis of rotation, starting from the blade leading edge in the direction of the blade trailing edge, lies along the profile chord between the blade leading edge and the inflection point. Owing to the design of the guide blade with the described arrangement of the guide blade axis of rotation with respect to the inflection point of the profile centerline, reduced wear of the VTG components, such as of blade levers and an adjusting ring (which are explained in more detail below), can be achieved at the same time as a small increase, if any at all, in the required actuating forces. This makes it possible to achieve a good compromise between the sum of all the acting loads, torques and forces (e.g. forces/pulses from the fluid flow, excitations before a turbine wheel entry, excitations/pulses between an inlet guide grate and/or in a turbine housing, superposition of forces, flow enthalpy, etc.) on the guide blade and on a guide device, in particular on a variable turbine geometry, and only a small increase, if any at all, in the actuating forces for the guide device. Tests have shown that the design according to the invention of the guide blade makes it possible to reduce an absorption of pulsations and/or excitations from the fluid flow, and therefore fewer vibrations and/or changing loads (especially changing moments, which can be transferred to the guide blade by a fluid flow) occur and fewer vibrations and/or changing loads are transmitted to the other components. Owing to the guide blade design according to the invention, significantly fewer alternating moments can be transmitted to the guide blades during a motor cycle by the fluid flow (i.e. fewer changing moments). In other words, the guide blades are thus subjected mainly or only to moments which are directed in an opening direction of the guide blades. The guide blades are subjected to only a few opposing moments, if any at all, especially those directed in a closing direction of the guide blades when the blades are used in a VTG. The design according to the invention of the guide blade also means that fewer vibrations and/or changing loads can be transmitted between the blade lever and the adjusting ring. The guide blade can be used for Mono Volute concepts (i.e. a turbine housing with only one volute or spiral) as well as DualVolute concepts (i.e. a turbine housing with two volutes or spirals) and can provide the described advantageous effects. In addition, jamming of components of the guide device, in particular the variable turbine geometry, can be prevented or reduced (in particular between the adjusting ring and the blade lever). Kinematic damage to the components and uncontrollability of the uses of the guide device in the event of higher running time and running performance can be prevented or reduced.

In embodiments, the profile chord can in each case form an intersecting point with the blade leading edge and the blade trailing edge. The profile chord can define an X axis of a coordinate system, wherein the X axis extends along the profile chord and from the blade leading edge to the blade trailing edge. In particular, a chord length of the profile chord can be measured parallel to the profile chord and between the respective intersecting points of the profile chord with the blade leading edge and the blade trailing edge.

In embodiments, the axis of rotation can be located along the X axis at a position which meets the following condition:

$$0.20 \leq X_{PA}/C \leq 0.35, \text{ preferably } 0.21 \leq X_{PA}/C \leq 0.32 \text{ and in particular}$$

$$0.23 \leq X_{PA}/C \leq 0.31,$$

where $X_{PA}$ is defined as the distance between the axis of rotation and the blade leading edge along the X axis.

In embodiments, a Y axis of the coordinate system can be defined orthogonally to the X axis and run through an intersecting point of the profile chord with the blade leading edge. In particular, the axis of rotation can be located along the Y axis at a position which meets the following condition:

$$Y_{PA} \leq 0, \text{ in particular } -0.005 \leq Y_{PA}/C \leq 0, \text{ preferably } -0.004 \leq Y_{PA}/C \leq 0,$$

where $Y_{PA}$ is defined as the distance between the axis of rotation and the profile chord along the Y axis.

In embodiments, the inflection point can be located along the X axis at a position which meets the following condition:

$$X_{PA}<X_{IP}, \text{ preferably } 0.35<X_{IP}/C\leq 0.6 \text{ and in particular } 0.40\leq X_{IP}/C\leq 0.45,$$

where $X_{IP}$ is defined as the distance between the inflection point and the blade leading edge along the X axis.

In embodiments, a distance between the inflection point and the axis of rotation along the X axis can meet the following condition:

$$0.05\leq X_A/C\leq 0.25, \text{ preferably } 0.07\leq X_A/C\leq 0.22 \text{ and in particular}$$

$$0.09\leq X_A/C\leq 0.20,$$

where $X_A$ is defined as the distance between the inflection point and the axis of rotation along the X axis.

In embodiments, the inflection point can be located along the Y axis at a position which meets the following condition:

$$0\leq Y_{IP}, \text{ in particular } 0\leq Y_{IP}/C\leq 0.02, \text{ preferably } 0.01\leq Y_{IP}/C\leq 0.015,$$

where $Y_{IP}$ is defined as the distance between the inflection point and the profile chord along the Y axis.

In embodiments, the blade top side and the blade underside can be designed in such a way that the profile centerline has an undulating form with the inflection point. In particular, the profile centerline can have a first curved region and a second curved region, between which the inflection point is defined.

In embodiments, the blade top side and/or the blade underside can have a concave portion and a convex portion with respect to the profile chord. The blade top side can have a concave portion followed by a convex portion, starting from the blade leading edge in the direction of the blade trailing edge and with respect to the profile chord. Alternatively or additionally, the blade underside can have a convex portion followed by a concave portion, starting from the blade leading edge in the direction of the blade trailing edge and with respect to the profile chord.

In embodiments, the profile centerline can define a first local extremum between the blade leading edge and the inflection point. The profile centerline can define a second local extremum between the inflection point and the blade trailing edge. In particular, the first local extremum can be a low point. The second local extremum can be a high point.

In embodiments, the first local extremum with respect to the axis of rotation and the inflection point is located along the X axis at a position which meets the following condition:

$$X_{E1}<X_{PA}<X_{IP},$$

where $X_{E1}$ is defined as the distance between the first local extremum and the blade leading edge along the X axis, and where $X_{IP}$ is defined as the distance between the inflection point and the blade leading edge along the X axis.

According to a second aspect of the present invention, a guide device, in particular a variable turbine geometry, comprises a blade bearing ring and at least one guide blade according to the first aspect of the present invention. The at least one guide blade is mounted in the blade bearing ring rotatably and adjustably via a blade shaft.

According to a third aspect of the present invention, a turbine for a supercharging device comprises a turbine housing, a turbine wheel which is arranged rotatably in the turbine housing, and a guide device according to the second aspect of the present invention which is arranged radially outside the turbine wheel in the turbine housing and circumferentially surrounds the turbine wheel.

According to a fourth aspect of the present invention, a supercharging device for an internal combustion engine or a fuel cell comprises a bearing housing, a shaft which is mounted rotatably in the bearing housing, a compressor with a compressor wheel, and a turbine according to the third aspect of the present invention. The turbine wheel and the compressor wheel are coupled to the shaft at opposite ends of the shaft for conjoint rotation.

According to a fourth aspect of the present invention, an engine system comprises an internal combustion engine having a plurality of cylinders, and a supercharging device according to the fourth aspect of the present invention. A turbine inlet of the turbine housing is fluidically connected to the plurality of cylinders downstream of the internal combustion engine.

The guide device, the turbine, the supercharging device and the engine system according to the aspects of the present invention can provide the advantages described above and have the embodiments described above.

DETAILED DESCRIPTION

Figure 1:
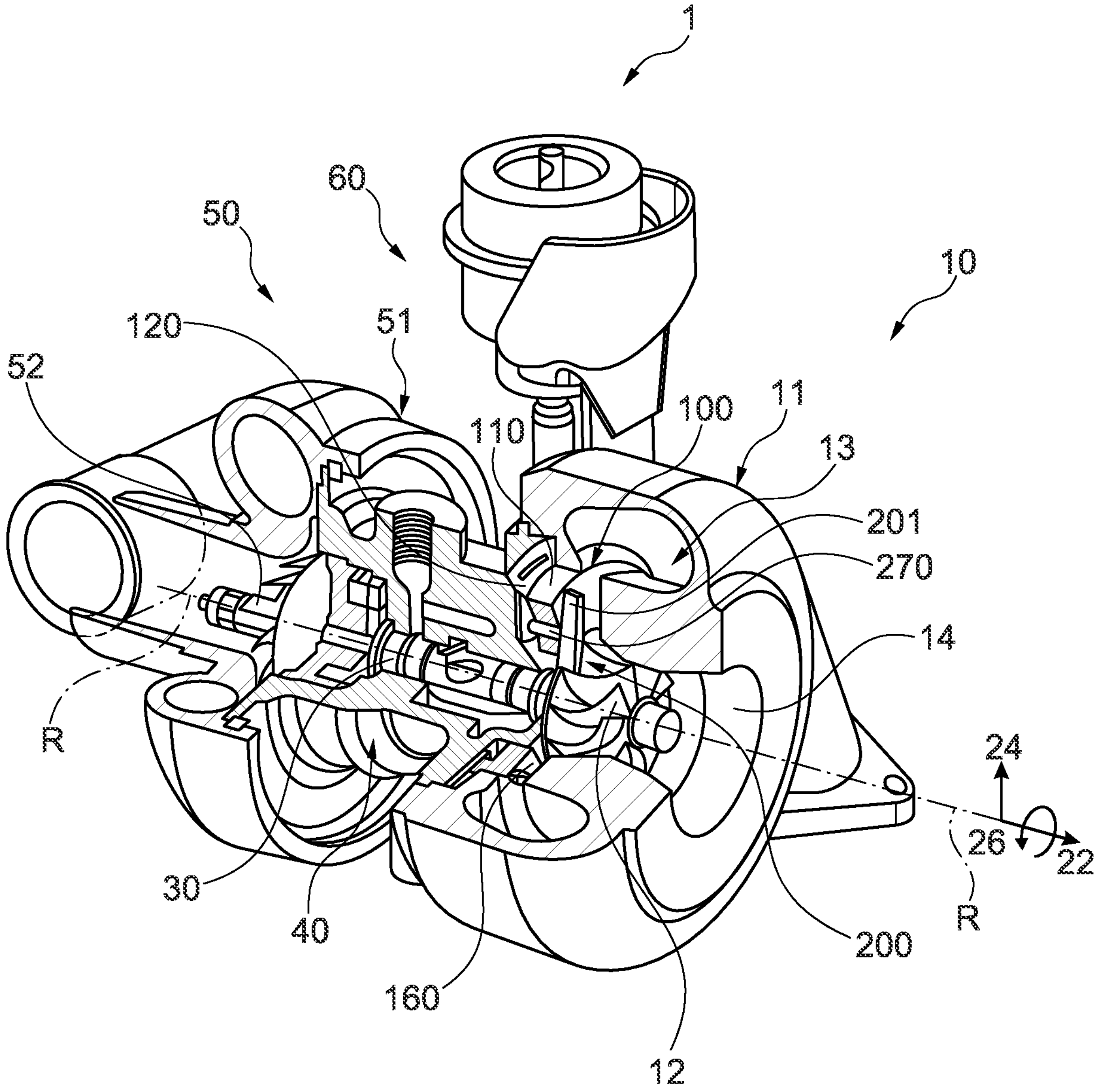
FIG. 1 shows an isometric view of an exemplary supercharging device with a turbine and a compressor.

In the context of this application, the expressions "axial" and "axial direction" relate to an axis of rotation X of the shaft 30 or of the turbine wheel 12, the axis of rotation of the turbine 10, of the guide device 100 and/or of the adjusting ring 200. With reference to the Figures (see e.g. FIGS. 1 to 8), the axial direction is represented by the reference sign 22. A radial direction 24 relates here to the axial direction 22. Likewise, a circumference or a circumferential direction 26 relates here to the axial direction 22. The directions 22 and 24 run orthogonally to each other.

FIG. 1 shows an exemplary supercharging device 1. The supercharging device 1 can be used, and/or correspondingly configured or dimensioned, for an internal combustion engine or a fuel cell.

Figure 2A:
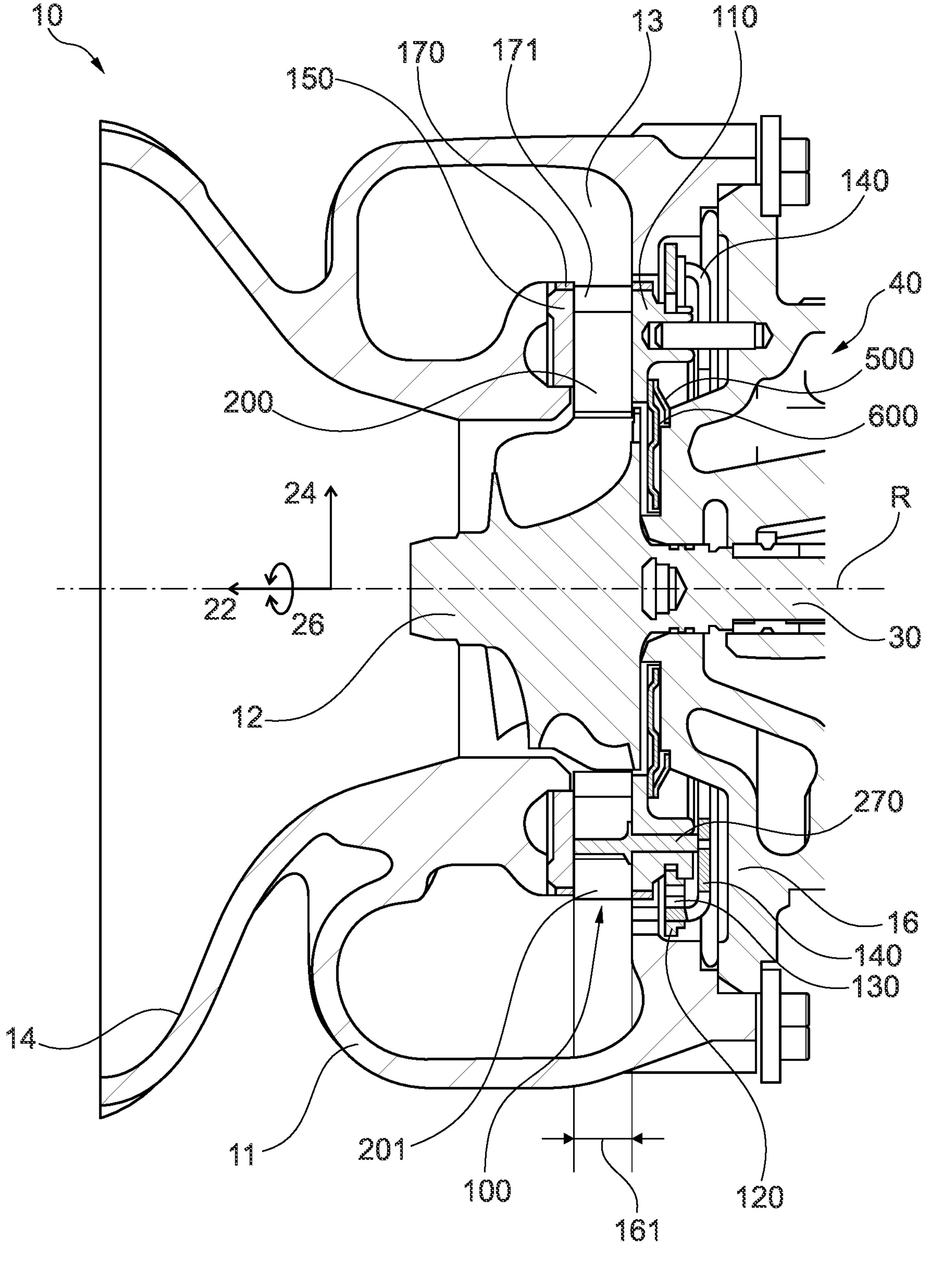
FIG. 2A shows a sectional view of the turbine.
Figure 2B:
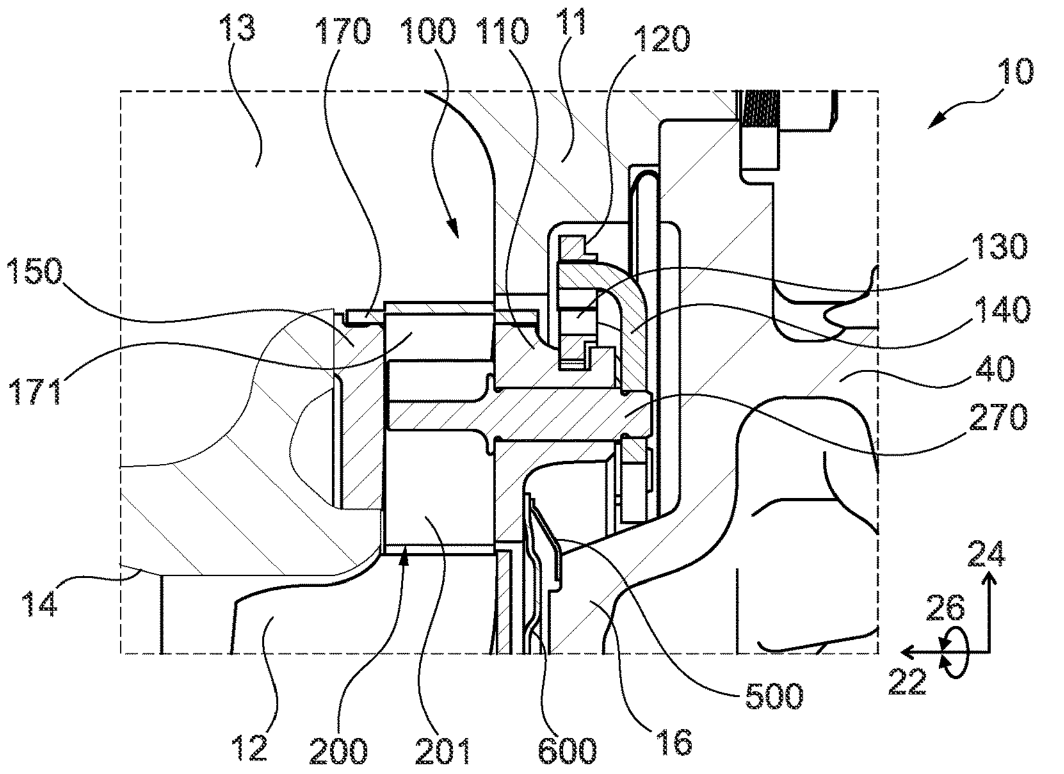
FIG. 2B shows a more detailed sectional view of the turbine from FIG. 2A.
Figure 8:
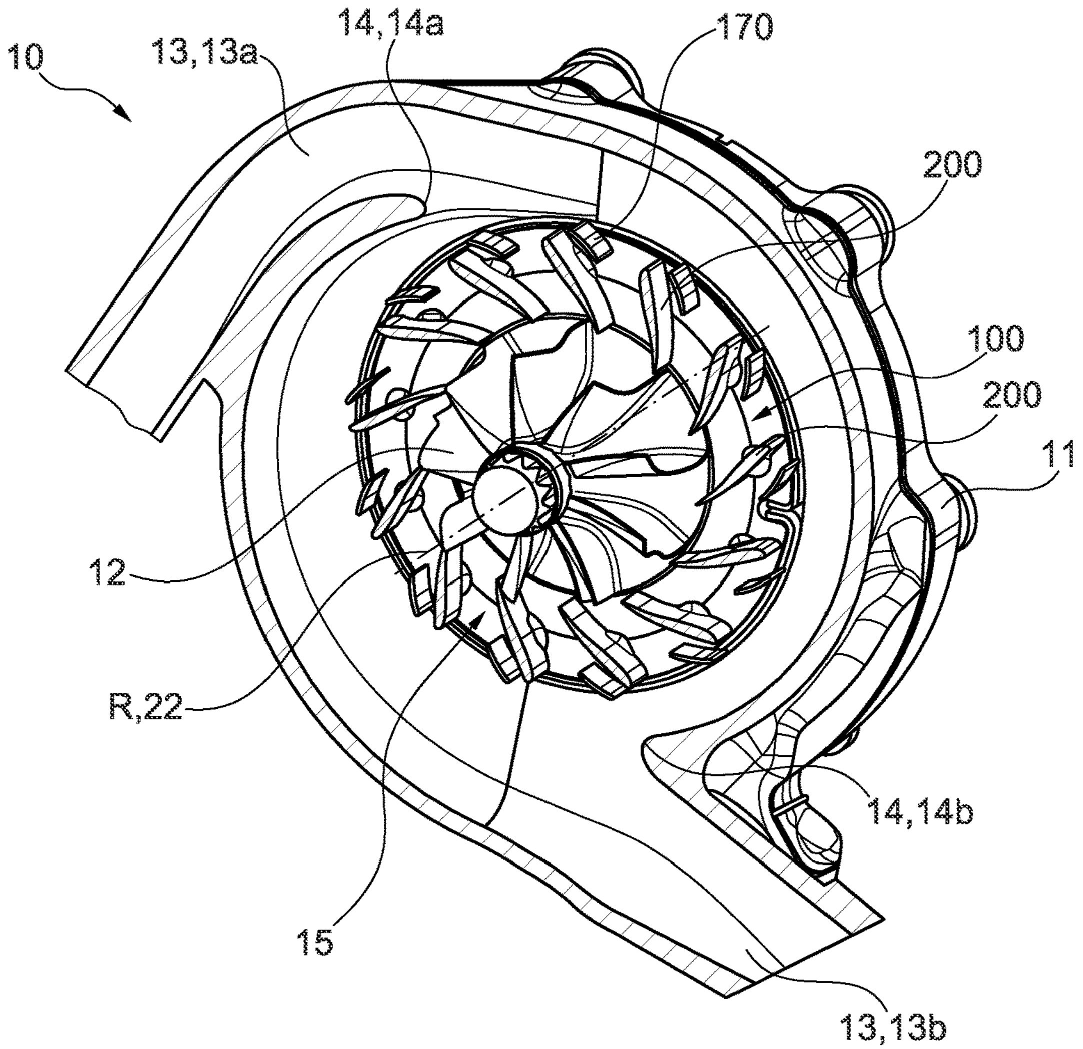
FIG. 8 shows a perspective sectional view of a turbine with a guide device, in particular a VTG, and a plurality of guide blades according to the invention.

As shown in FIG. 1, the supercharging device 1 comprises a turbine 10, a bearing housing 40 and a compressor 50. As shown in FIG. 1, the supercharging device 1 can comprise an actuating device 60. The supercharging device 1 can be a turbocharger. In embodiments, the supercharging device 1 can be in the form of an E-turbo (not illustrated in the figs). The turbine 10 comprises a turbine housing 11 in which a turbine wheel 12 is arranged. The turbine 10 can be a radial turbine in particular. The turbine housing 11 comprises a turbine inlet 13, a turbine outlet 14 and a receiving chamber 15, which is arranged between the turbine inlet 13 and the turbine outlet 14 and is fluidically connected to the turbine inlet 13 and the turbine outlet 14. The turbine wheel 12 is arranged in the receiving chamber 15. The turbine inlet 13 comprises at least one supply duct and the turbine outlet 14 comprises an outlet duct. The turbine wheel 12 is arranged between the at least one supply duct and the outlet duct. As shown in FIG. 8, the turbine inlet 13 can comprise a first supply duct 13*a* and a second supply duct 13*b*, which are spaced apart in the circumferential direction 26 from each other. The turbine 10 also comprises a turbine rear wall 16, which is coupled to the turbine housing 11 on the bearing housing side. As can be seen in FIGS. 2A and 2B, the turbine rear wall 16 can be formed as a part of the bearing housing 40. With reference to FIG. 1, the supercharging device 1 further comprises a shaft 30 with an axis of rotation X, which is rotatably coupled to the turbine wheel 12. The shaft 30 is mounted rotatably in the bearing housing 40. The axial direction 22 is defined here with respect to the axis of rotation X. As shown in FIG. 1, the compressor 50 comprises a compressor housing 51, in which a compressor wheel 52 is arranged. The bearing housing 40 is coupled (or connected) to the turbine housing 11. The bearing housing 40 is coupled (or connected) to the compressor housing 51. The compressor wheel 52 is coupled to the shaft 30 on an end of the shaft 30 opposite the turbine wheel 12 for conjoint rotation. As can be seen in FIG. 1, the turbine 10 comprises a guide device 100, in particular a variable turbine geometry, having at least one, in particular a plurality of, guide blades 200 according to the invention, which is or are explained in detail below.

In addition to the guide device 100, the turbine 10 (not shown in the FIGS.) comprise a power adjusting device in the form of a wastegate flap WG, which is provided to be able to close and open a wastegate of the turbine 10 when required. The wastegate flap WG can be connected here to the actuating device 60 via a lever and/or a control rod.

In embodiments, the supercharging device 1 can further comprise an electric motor (not shown in the FIGS.), which can be arranged in an engine compartment in the bearing housing 40. The turbine wheel 12 and/or the compressor wheel 52 can be coupled to the electric motor via the shaft 30. The electric motor can comprise a rotor and a stator, in particular wherein the rotor can be arranged on the shaft 30, and wherein the stator surrounds the rotor. Further, a power electronics circuit for controlling the electric motor can be arranged in a receiving chamber in the bearing housing 40. The electric motor can also include a generator mode.

Figure 3B:
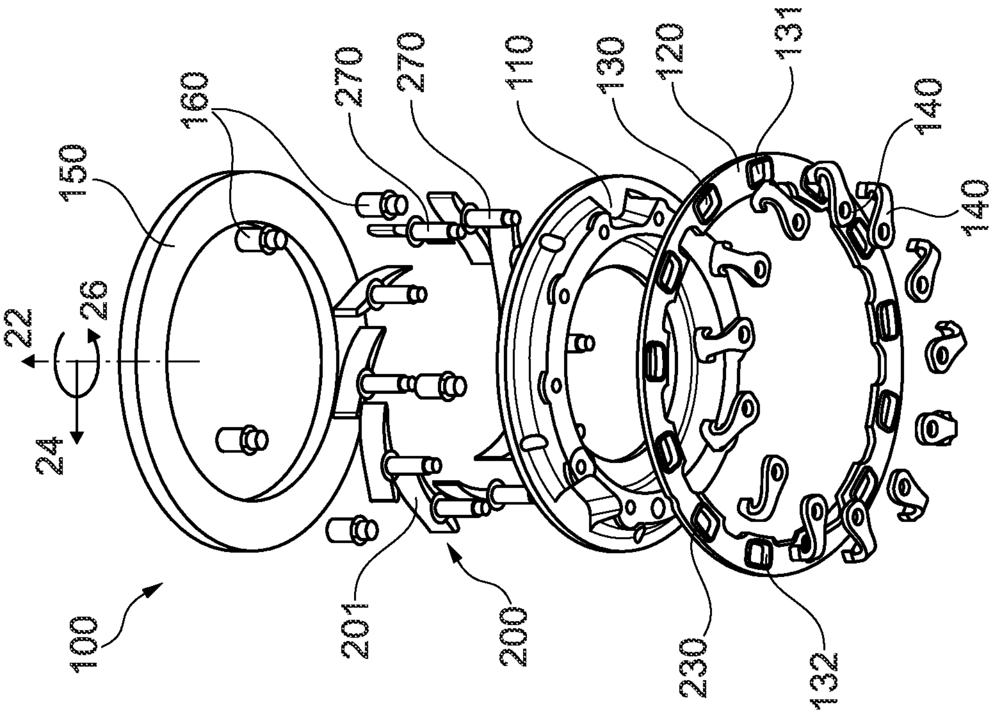
FIGS. 3A, 3B show a perspective view and an exploded view of a guide device having a plurality of guide blades according to the invention.
Figure 3A:
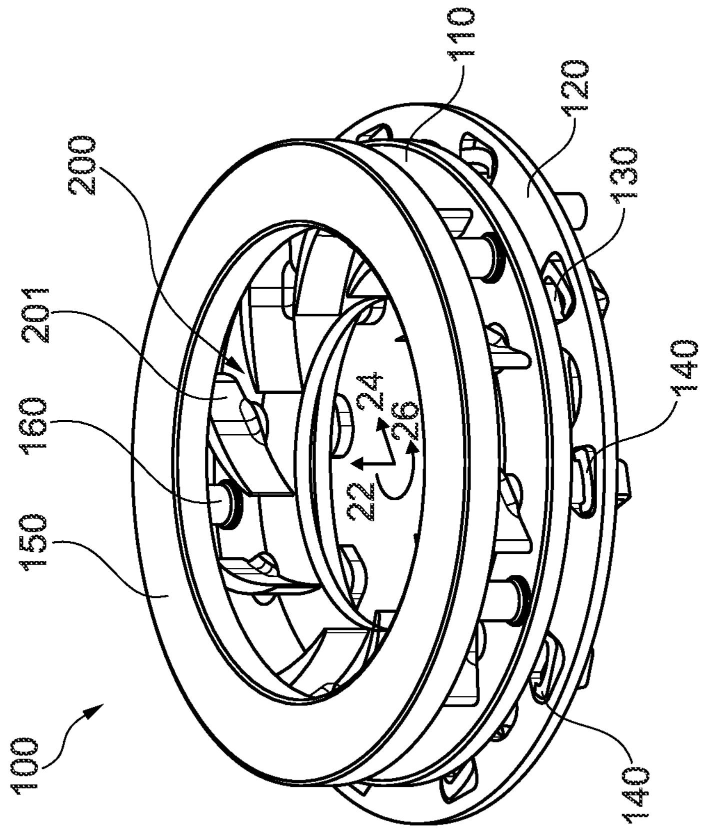

FIGS. 2A and 2B show sectional views of the turbine 10 with a guide device 100, in particular a variable turbine geometry. FIGS. 3A and 3B show a perspective view and an exploded view of a guide device 100 having a plurality of guide blades 200. The guide device 100, in particular the variable turbine geometry, is provided for changing an inflow to the turbine wheel 12. The guide device 100 is arranged radially outside the turbine wheel 12, in particular wherein the guide device 100 circumferentially surrounds the turbine wheel 12. In this case, the guide device 100 can be provided as a cartridge, which is mounted in the turbine housing 11. In particular, the guide device 100 can be pre-assembled as a cartridge and mounted via at least three pins evenly spaced apart in the circumferential direction 26 on the turbine housing rear wall 16, in particular on the bearing housing 40.

As shown in FIGS. 2A to 3B and 7A and 7B, the guide device 100, in particular the variable turbine geometry, comprises a blade bearing ring 110. In addition, the guide device 100 comprises at least one guide blade 200 according to the present invention (will be explained in detail below), which is rotatably and adjustably mounted in the blade bearing ring 110 via a blade shaft 270. The guide device can be configured or designated as a variable guide device 100. In particular, the guide device 100, in particular the variable turbine geometry 100, can have a plurality of adjustable guide blades 200, wherein each guide blade 200 of the plurality of guide blades 200 is mounted rotatably and adjustably in the blade bearing ring 110 via a blade shaft 270.

Figure 4A:
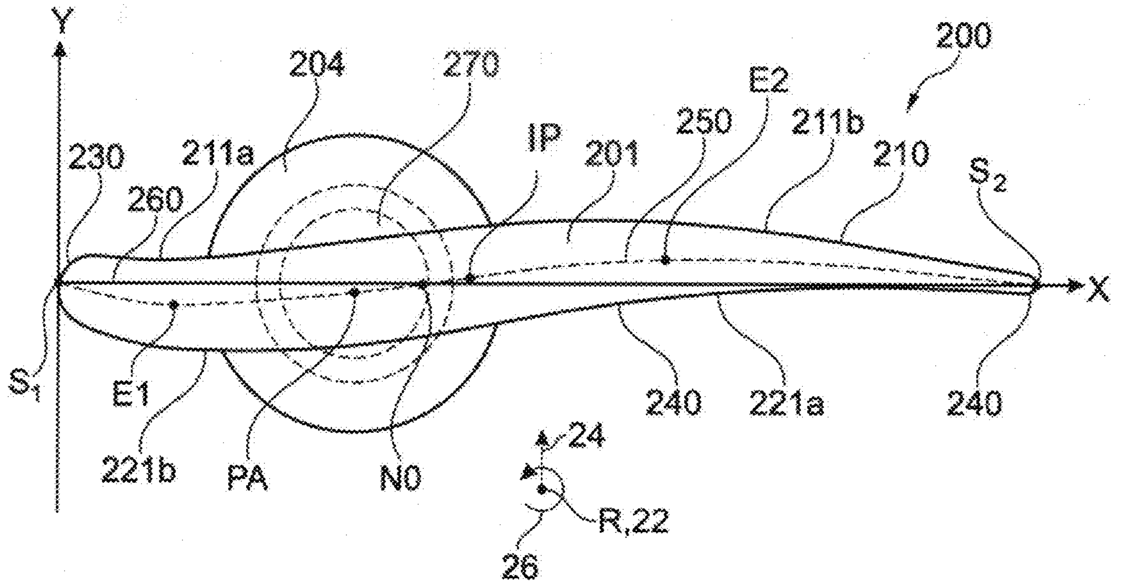
FIGS. 4A to 4C show sectional views of the guide blade according to the present invention.
Figure 4B:
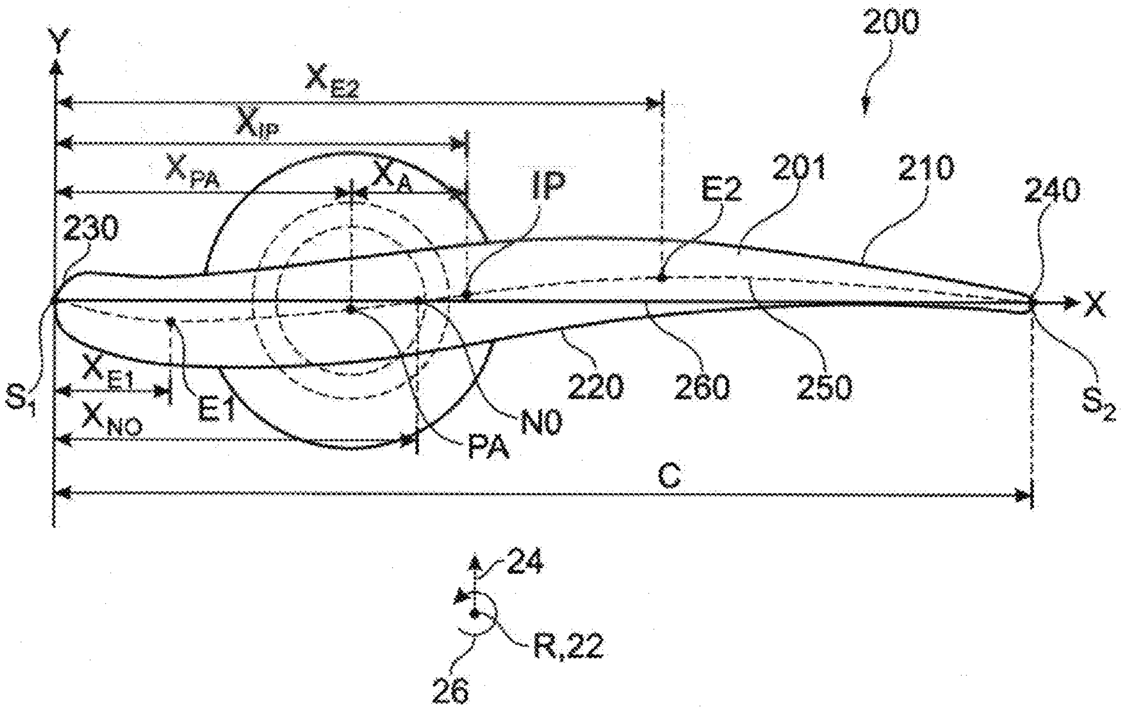
Figure 4C:
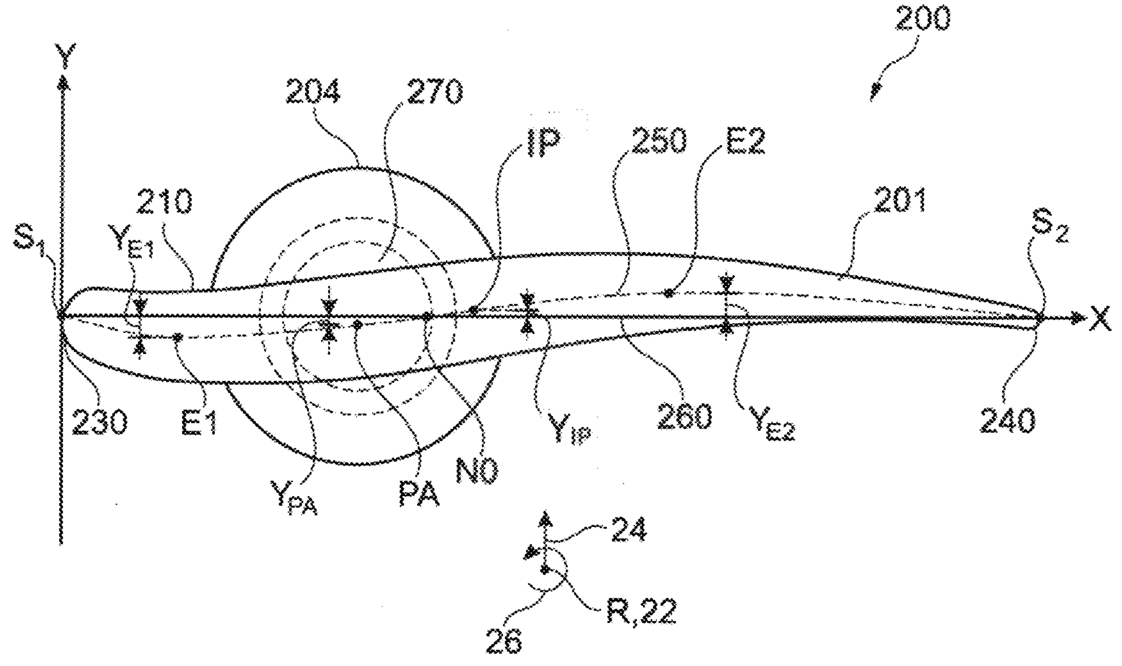
Figure 5:
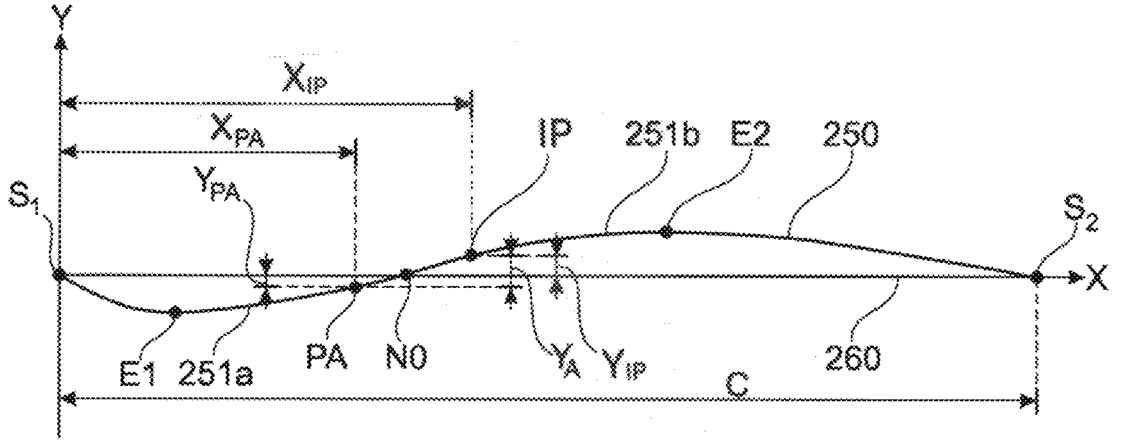
FIG. 5 shows more precisely a course of a profile centerline and the position of an axis of rotation of the guide blade of FIGS. 4A to 4C.

FIGS. 4A to 4C show sectional views of an (optimized) guide blade 200 according to the invention for a guide device 100, in particular for a variable turbine geometry 100, sectioned along a longitudinal direction of a guide blade body 201. FIG. 5 shows in detail the course of a profile centerline 250 and the position of a guide blade axis of rotation PA of the guide blade 200 of FIGS. 4A to 4C. With reference to FIGS. 4A to 4C, the guide blade 200 has a guide blade body 201 having a blade leading edge 230 or incident-flow edge and a blade trailing edge 240 or outflow edge. The guide blade body 201 also comprises a blade top side 210 and a blade underside 220. The blade underside 220 is the side which, in the installed state of the guide blade 200, faces the turbine wheel 12 (or the axis of rotation R) (see FIGS. 7A to 8). The blade top side 210 is the side which, in the installed state of the guide blade 200, faces away from the turbine wheel 12 (see FIGS. 7A to 8). The guide blade 200 comprises a profile centerline 250, which is defined in a profile of the guide blade body 201 by the blade top side 210 and the blade underside 220 and runs between them from the blade leading edge 230 to the blade trailing edge 240. The profile centerline 250 has a turning point IP. The blade leading edge 230 and the blade trailing edge 240 are connected by a profile chord 260. The guide blade 200 has a guide blade axis of rotation PA, wherein the axis of rotation PA is located, starting from the blade leading edge 230 in the direction of the blade trailing edge 240, along the profile chord 260 between the blade leading edge 230 and the inflection point IP. The guide blade axis of rotation PA is located, starting from the blade leading edge 230 in the direction of the blade trailing edge 240, along the profile chord 260 between the blade leading edge 230 and the inflection point IP.

Owing to the design of the guide blade 200 with the described arrangement of the guide blade axis of rotation PA with respect to the inflection point IP of the profile centerline, reduced wear of the VTG components, such as of the blade lever 140 and the adjusting ring 120 (which are explained in more detail below), can be achieved at the same time as a small increase, if any at all, in the required actuating forces. This makes it possible to achieve a good compromise between the sum of all the acting loads, torques and forces (e.g. forces/pulses from the fluid flow, excitations before turbine wheel entry, excitations/pulses between an inlet guide grate 170 and/or turbine housing 11, superposition of forces, flow enthalpy, etc.) on the guide blade 200 and on the guide device 100, but little to no increase in the required actuating forces. Tests have shown that the design according to the invention of the guide blade 200 makes it possible to reduce an absorption of pulsations and/or excitations from the fluid flow and therefore fewer vibrations and/or changing loads (especially changing moments, which can act on the guide blade 200 by the fluid flow) occur and fewer vibrations and/or changing loads are transmitted to the other components. In particular, the design according to the invention of the guide blade 200 means that fewer vibrations and/or changing loads can be transmitted between the blade lever 140 and the adjusting ring 120. The guide blade 200 can be used for Mono Volute concepts (i.e. a turbine housing with only one volute or spiral) as well as DualVolute concepts (i.e. a turbine housing with two volutes or spirals). In addition, jamming of components of the guide device 100, in particular the variable turbine geometry, can be prevented or reduced. Kinematic damage to the components and uncontrollability of the uses of the guide device 100 in the event of higher running time and running performance can be prevented or reduced.

Figure 2C:
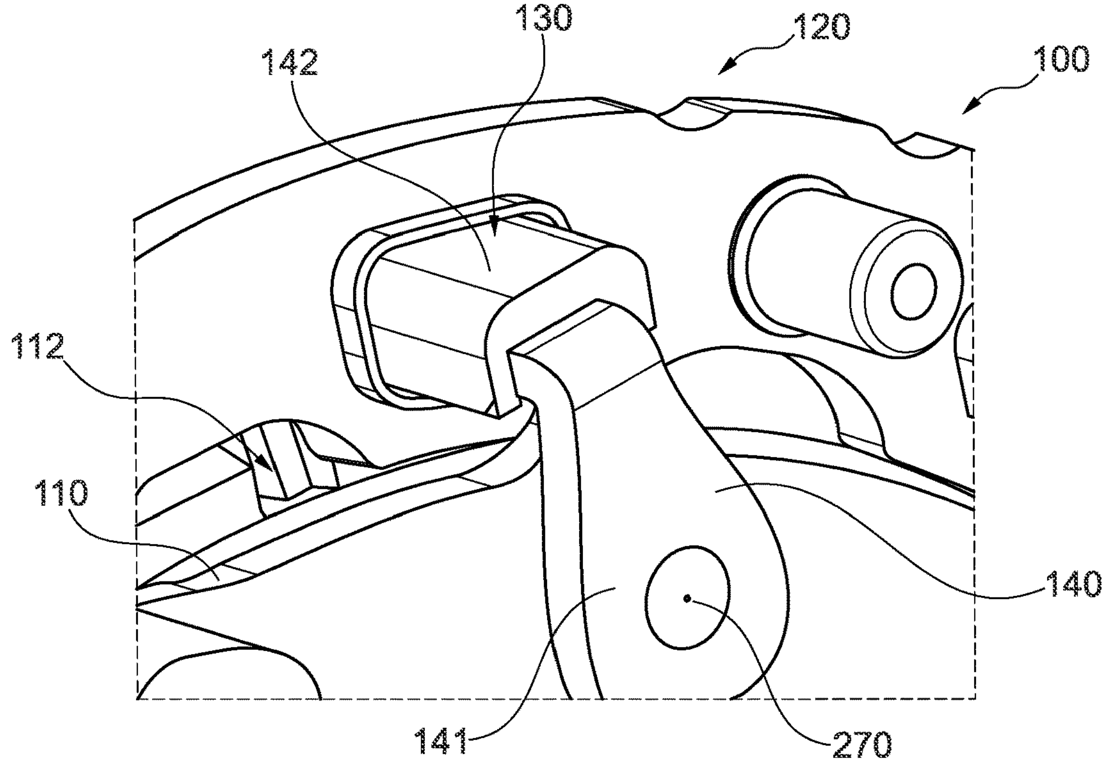
FIG. 2C shows a detailed perspective view of a guide device, in particular a variable turbine geometry (VTG)

Owing to the guide blade design according to the invention, significantly fewer alternating moments can be transmitted to the guide blades 200 during a motor cycle by the fluid flow (i.e. fewer changing moments). In other words, the guide blades 200 are thus subjected mainly or only to moments which are directed in an opening direction of the guide blades 200. With reference to FIG. 2C, this means that the guide blade 200 transmits a moment to the blade lever 140, which acts to the "right" in the circumferential direction on the adjusting ring 120 (the latter striking on the right side of the coupling region 130). The guide blades 200 are subjected to only a few opposing moments, if any at all, especially those directed in a closing direction of the guide blades 200 when the blades are used in a VTG. With reference to FIG. 2C, this means that the guide blade 200 receives only a few moments, if any at all, through the fluid flow, said moments acting alternately in the circumferential direction 26 "on the left" and "on the right" on the adjusting ring 120, that is, the blade lever 140 alternately strikes on the left side and the right side in the coupling region 130. Changing moments that contribute to wear can thus be reduced. Of course, however, a change can occur when the adjusting ring 120 for adjusting the guide blades 200 is actuated, since the respective stop of the blade levers in the coupling region 130 causes the adjusting forces to be transmitted to the guide blades 200 in order to move them between a first position 180 and a second position 190.

Figure 10A:
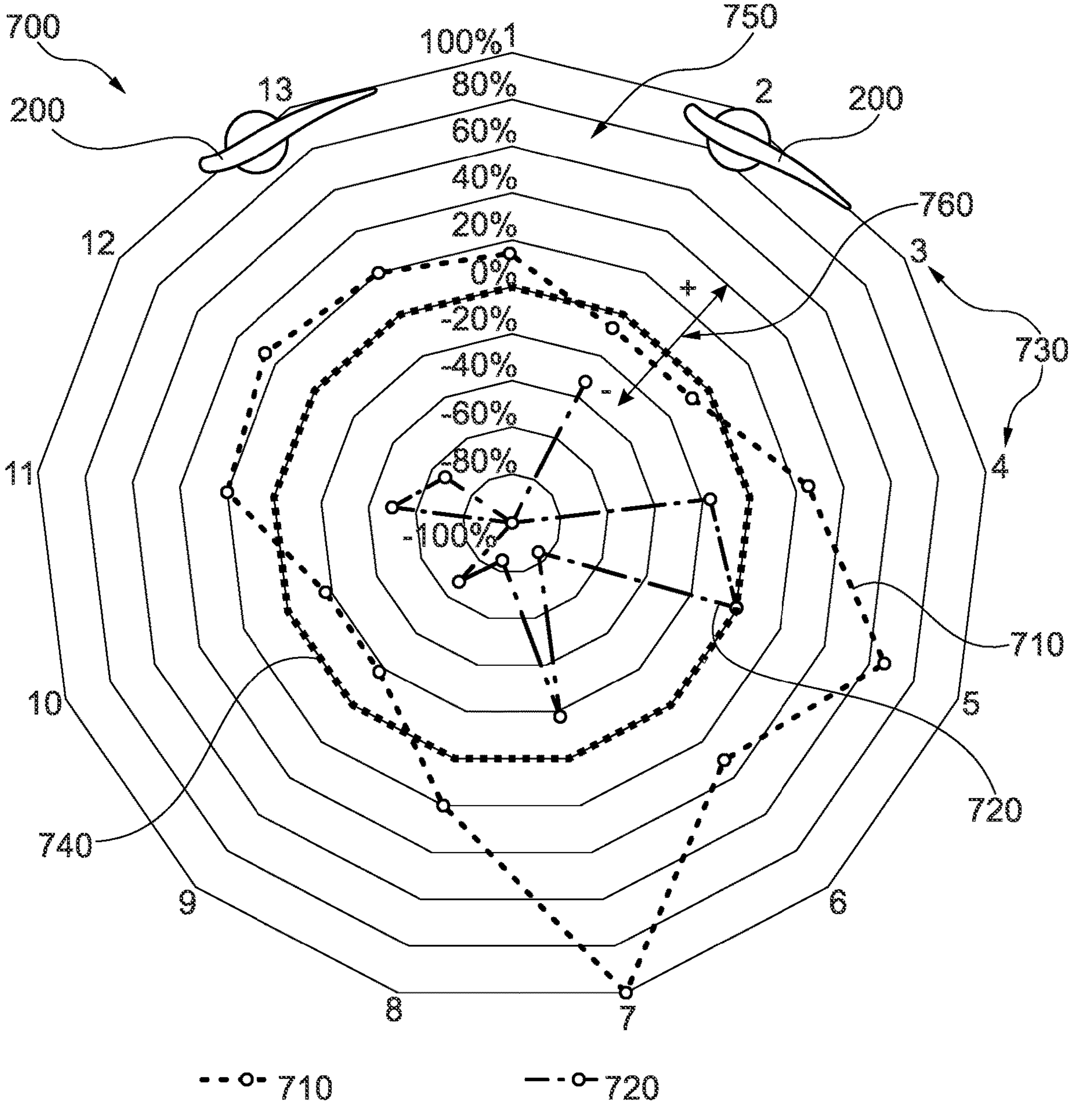
FIGS. 10A, 10B show a diagram in which the moments acting on the respective guide blades during operation are plotted for conventional guide blades in comparison to the optimized guide blades according to the invention.
Figure 10B:
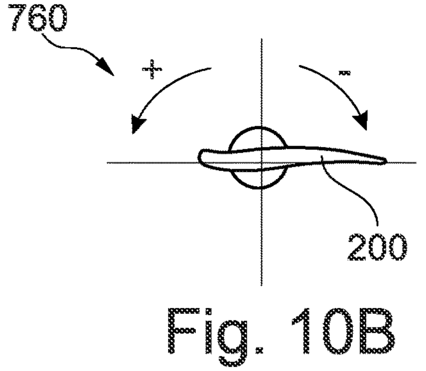

FIG. 10A shows a diagram 700 in which the moments acting on the respective guide blades during operation are applied to conventional guide blades in comparison to the guide blades 200 according to the invention. "Operation" means that in this test the VTG with the guide blades 200 according to the invention is arranged in a turbine housing 11 (see FIG. 8; described in detail below) and a fluid flow to the guide blades 200 is provided by supply ducts 13*a*, 13*b*. The fluid flow represents exhaust gas, which is supplied by an internal combustion engine to the turbine housing during operation. FIG. 10B indicates a direction of the moments 760, which can act on the respective guide blade. A negative moment (−), which is directed clockwise in the exemplary embodiment shown, is the standard moment, which is to be transmitted during operation of the VTG, in particular of the guide blades 200, to the guide blades 200 because of the fluid flow. As described above, this standard moment is therefore intended to act in the opening direction of the guide blades 200 ("fail safe open"). The positive moment (+) represents an opposite moment, which acts in the closed position of the guide blades (i.e. counterclockwise in the embodiment in FIG. 10B). In particular, these alternating moments for the guide blades (i.e. alternating moments that change between positive moments (+) and negative moments (−)) can significantly contribute to the wear of the components of the VTG. In FIG. 10A, a moment diagram 700 is shown for a test carried out of a VTG with 13 (see numbers 1 to 13) guide blades. The negative (−) and positive (+) moments 760 acting on said guide blades during operation are applied as a percentage for the respective guide blades. A chain-dotted line 740 indicates the 0% line at which a very small moment (or no moment) acts on the respective guide blade during operation. The dashed line 710 indicates the test results for conventional guide blades. The dash-dotted line 720 shows the test results for a VTG with the (optimized) guide blades 200 according to the invention. The tests carried out have shown that alternating moments can be reduced or prevented for all the guide blades by the (optimized) guide blades 200 according to the invention (see FIG. 10A: all the moments are negative moments (−) or in the case of the guide blade number 5 "zero moments"). Thus, all the moments act in the opening direction of the respective guide blades (in the case of guide blade number 5, no moment is in action). This leads to a lower wear of the VTG components, since, for example, with reference to FIG. 2C, the adjusting levers 140 in the coupling region 130 do not strike alternately "on the left" and "on the right" (in particular if no adjustment is made by the adjusting ring). In comparison thereto, tests carried out with conventional guide blades (see dashed line 710) and under the same test conditions (e.g., the same operating point and/or position of the guide blades) have shown that conventional guide blade numbers 1, 5, 6, 7, 8, 11, 12, 13 experience a positive moment (+) (which thus acts in the closing direction of the respective guide blade), while guide blade numbers 2 to 4, 9 and 10 experience a negative moment (−) (which acts in the opening position of the respective guide blade), said alternating moments increasing the wear of the VTG components.

With reference to FIGS. 4A to 5, the profile centerline 250 can also be referred to as the skeleton line or curvature line of the guide blade body 201. The blade top side 210 and the blade underside 220 are designed such that the profile centerline 250 has an undulating form with the inflection point IP. Since the profile centerline 250 extends from the blade leading edge 230 to the blade trailing edge 240 between the blade top side 210 and the blade underside 220, the course thereof can be dependent on a shape or design of the blade top side 210 and the blade underside 220. The guide blade 200 can have a larger radius at the blade leading edge 230 than at the blade trailing edge 240. A blade thickness or profile thickness is determined by the blade top side 210 and the blade underside 220 and can in each case be measured orthogonally to the profile centerline 250 between them. The blade leading edge 230 and the blade trailing edge 240 can represent respective intersecting points of the blade top side 210 and the blade underside 220. The guide blade axis of rotation PA is the axis about which the guide blade 200 is rotatable when it is mounted in a blade bearing ring 110 (this is described in detail below).

The profile chord 260 defines a chord length C, in particular wherein the profile chord 260 runs as a linear connection between the blade leading edge 230 and the blade trailing edge 240. The terms "profile chord", "chord length" and "profile centerline" or "skeleton line" are commonly used to define profiles and are known to the skilled person. The profile chord 260 together with the blade leading edge 230 and the blade trailing edge 240 can in each case form an intersecting point $S_1$, $S_2$, in particular at which the blade leading edge 230 and the blade trailing edge 240 each have a surface point with a smallest radius. In other words, the point of the blade leading edge 230, which is used to determine the profile chord 260, can be the surface point with the smallest radius (the same is true for the blade trailing edge 240). The profile chord 260 can also run through a starting point and an end point of the profile centerline 250 on the blade leading edge 230 and the blade trailing edge 240. The profile centerline 250 represents an imaginary connecting line, starting from the intersecting point $S_1$ with the blade leading edge 230 to the intersecting point $S_2$ to the blade trailing edge 240, between circular centers of a plurality of imaginary circles, which are arranged within the blade profile and are each tangential to the blade top side and the blade underside.

As shown in FIGS. 4A to 5, the profile chord 260 can define an X axis of a coordinate system X, Y, wherein the X axis extends along the profile chord 260 and from the blade leading edge 230 to the blade trailing edge 240. A Y axis of the coordinate system X, Y is defined orthogonally to the X axis and runs through the intersecting point $S_1$ of the profile chord 260 with the blade leading edge 230. In particular, the Y axis consequently also runs orthogonally to the profile chord 260. The Y axis has positive values starting from the profile chord 260 or X axis in the direction of the blade top side 210 or pressure side. As described above, the blade top side 210 is the side which, in an installed state of the guide blade 200, faces away from the axis of rotation R, 22 of the guide device 100 (in particular of the variable turbine geometry) or the turbine wheel 12. The Y axis has negative values starting from the profile chord 260 or X axis in the direction of the blade underside 220 or suction side, which, in an installed state of the guide blade 200, is the side facing the axis of rotation R, 22 of the guide device 100 (in particular the variable turbine geometry) or the turbine wheel 12, in particular is directed radially inward. More specifically, the chord length C is measured parallel to the profile chord 260 and can be measured between the respective intersecting points $S_1$, $S_2$ of the profile chord 260 with the blade leading edge 230 and the blade trailing edge 240. The chord length C can be measured between the respective intersecting points $S_1$, $S_2$ of the profile chord 260 and the surface of the blade leading edge 230 and the blade trailing edge 240 at the respective surface point of the smallest radius. The blade leading edge 230 is at X=0 and the blade trailing edge 240 is at X=C.

With reference to FIGS. 4A to 5, the guide blade axis of rotation PA can be located along the X axis (or profile chord 260) in a position which meets the following condition:

$$0.20 \leq X_{PA}/C \leq 0.35, \text{ preferably } 0.21 \leq X_{PA}/C \leq 0.32 \text{ and in particular}$$

$$0.23 \leq X_{PA}/C \leq 0.31,$$

where $X_{PA}$ is defined as the distance between the guide blade axis of rotation PA and the blade leading edge 230 along the X axis. In a particularly preferred embodiment, the guide blade axis of rotation PA can be located along the X axis at a position which meets the following condition:

$$0.28 \leq X_{PA}/C \leq 0.31.$$

In addition, the guide blade axis of rotation PA can be located along the Y axis at a position which meets the following condition:

$$Y_{PA} \leq 0, \text{ in particular } -0.005 \leq Y_{PA}/C \leq 0, \text{ preferably } -0.004 \leq Y_{PA}/C \leq 0,$$

where $Y_{PA}$ is defined as the distance between the guide blade axis of rotation PA and the profile chord 260 along the Y axis.

In particular, the guide blade axis of rotation PA can be located along the X axis and the Y axis at a position which meets the following condition:

$$0.20 \leq X_{PA}/C \leq 0.35 \text{ and } -0.005 \leq Y_{PA}/C \leq 0,$$

$$\text{in particular } 0.23 \leq X_{PA}/C \leq 0.31 \text{ and } -0.004 \leq Y_{PA}/C \leq 0,$$

where $X_{PA}$ is defined as the distance between the guide blade axis of rotation PA and the blade leading edge 230 along the X axis, and wherein $Y_{PA}$ is defined as the distance between the guide blade axis of rotation PA and the profile chord 260 along the Y axis.

As is shown for example in FIG. 5, the inflection point IP of the profile centerline 260 can be located along the X axis at a position which meets the following condition:

$$X_{PA} \leq X_{IP}, \text{ preferably } 0.35 < X_{IP}/C \leq 0.6 \text{ and in particular } 0.40 \leq X_{IP}/C \leq 0.45,$$

where $X_{IP}$ is defined as the distance between the inflection point IP and the blade leading edge 230 along the X axis. A distance $X_A$ between the inflection point IP and the guide blade axis of rotation PA along the X axis can meet the following condition:

$$0.05 \leq X_A/C \leq 0.25, \text{ preferably } 0.07 \leq X_A/C \leq 0.22 \text{ and in particular}$$

$$0.09 \leq X_A/C \leq 0.20,$$

where $X_A$ is defined as the distance between the inflection point IP and the guide blade axis of rotation PA along the X axis. In embodiments, the following condition can be met:

$$0.09 \leq X_A/C \leq 0.14.$$

The distance $X_A$ results from $X_A = X_{IP} - X_{PA}$. In preferred examples, the chord length C can be from 15 mm to 25 mm and a distance $X_A$ from 2 mm to 4 mm.

In embodiments, the inflection point IP along the Y axis can be located at a position which meets the following condition:

$$0 \leq Y_{IP}, \text{ in particular } 0 \leq Y_{IP}/C \leq 0.02, \text{ preferably } 0.01 \leq Y_{IP}/C \leq 0.015,$$

where $Y_{IP}$ is defined as the distance between the inflection point IP and the profile chord 260 along the Y axis. A distance $Y_A$ between the inflection point IP and the guide blade axis of rotation PA along the Y axis can meet the following condition:

$$Y_{PA} < Y_{IP}, \text{ in particular } 0.005 \leq Y_A/C \leq 0.02, \text{ preferably } 0.012 \leq Y_A/C \leq \mathbf{0.018},$$

where $Y_A$ is defined as the distance between the inflection point IP and the guide blade axis of rotation PA along the Y axis. The distance $Y_A$ is calculated from the value $Y_A = Y_{IP} - Y_{PA}$. These values for the positions of the guide blade axis of rotation PA and the inflection point IP can reduce or avoid the alternating moments described above, and wear of the VTG components can be reduced by a reduced absorption of pulsations and/or excitations of the guide blade 200 from the fluid flow.

The blade top side 210 and the blade underside 220 can be designed such that the profile centerline 250 has an undulating form with the inflection point IP. As already described briefly above, the course of the profile centerline 250 is dependent on a shape or design of the blade top side 210 and the blade underside 220, since said profile centerline extends from the blade leading edge 230 to the blade trailing edge 240 between the blade top side 210 and the blade underside 220. In other words, a description of the course of the profile centerline 250 also allows a conclusion to be drawn about the design of the blade top side 210 and/or the blade underside 220. The blade top side 210 and/or the blade underside 220 can have an undulating form. As shown in FIGS. 4A to 4C, the blade top side 210 and the blade underside 220 can each have an undulating form. The blade top side 210 and/or the blade underside 220 can have a concave portion 211*a*, 221*a* and a convex portion 211*b*, 221*b* with respect to the profile chord 260. According to the embodiment in FIGS. 4A to 4C, the blade top side 210 can have a concave portion 211*a* followed by a convex portion 211*b* starting from the blade leading edge 230 in the direction of the blade trailing edge 240 and with respect to the profile chord 260. Alternatively or additionally, the blade underside 220 can have a convex portion 221*a* followed by a concave portion 221*b* starting from the blade leading edge 230 in the direction of the blade trailing edge 240 and with respect to the profile chord 260. In other words, the blade top side 210 and/or the blade underside 220 can be S-shaped. As can be seen from FIG. 5, the profile centerline 250 (in particular the course of the profile centerline 250) between the blade leading edge 210 and the blade trailing edge 220 can have precisely one turning point IP. The profile centerline 250 can have an undulating form with two oppositely curved regions 251*a*, 251*b*. The regions 251*a*, 251*b* can also be referred to as wave antinodes. In other words, the profile centerline 250 can have an S shape. According to FIG. 5, the profile centerline 250 can have a first curved region 251*a* and a second curved region 251*b* between which the inflection point IP is defined. The profile centerline 250 has a constant (or continuous) course. In other words, the profile centerline 250, in particular the course of the profile centerline 250, is free of kinks. The profile centerline 250 has the values X=0 and Y=0 on the blade leading edge 230 and the values X=C and Y=0 on the blade trailing edge 240. In other words, and as already described above, the profile centerline 250 runs through the intersecting points $S_1$, $S_2$ (as the start and end point) and then connects the imaginary circle centers of the imaginary circles, which are each tangential to the blade top side 210 and blade underside 220 in the guide blade body 201, between the intersecting points $S_1$, $S_2$.

As can likewise be seen in FIGS. 4A to 5, the profile centerline 250 between the blade leading edge 230 and a zero crossing NO can have negative Y values, wherein the zero crossing NO is defined as an intersecting point between the profile centerline 250 and the profile chord 260 (or X axis). The profile centerline 250 can have positive Y values between the zero crossing X0 and the blade trailing edge 240. Starting from the blade leading edge 230, the profile centerline 250 can have the first curved region 251*a* followed by the second curved region 251*b*, which is opposed to the first curved region. The inflection point IP lies between the first curved region and the second curved region. The first curved region 251*a* can have negative Y values from the blade leading edge 230 to the zero crossing NO. The second curved region 251*b* can have positive Y values after the zero crossing NO up to the inflection point IP. The second curved region 251*b* can have positive Y values from the inflection point IP to the blade trailing edge 240.

As shown in FIGS. 4A to 5, the profile centerline 250 can define a first local extremum E1 between the blade leading edge 230 and the inflection point IP. The profile centerline 250 can define a second local extremum E2 between the inflection point IP and the blade trailing edge 240. In particular, the first local extremum E1 can be a low point and the second local extremum E2 can be a high point. In particular, the first extremum E1 can be a first global extremum and the second extremum E2 can be a second global extremum. The first local extremum can lie between the blade leading edge 230 and the zero crossing NO. The second local extremum E2 can lie between the zero crossing NO and the blade trailing edge 240.

With reference to FIG. 4B, the first local extremum E1 and the second local extremum E2 are located along the X axis at a position which meets the following condition:

$$X_{E1} < X_{E2}, \text{ and/or}$$

$$0.08 \le X_{E1}/C \le 0.17, \text{ in particular } 0.11 \le X_{E1}/C \le 0.14, \text{ and/or}$$

$$0.50 \le X_{E2}/C \le 0.80, \text{ in particular } 0.60 \le X_{E2}/C \le 0.70,$$

where $X_{E1}$ is defined as the distance between the first local extremum E1 and the blade leading edge 230 along the X axis, and wherein $X_{E2}$ is defined as the distance between the second local extremum E2 and the blade leading edge 230 along the X axis.

The first local extremum E1 can be located with respect to the guide blade axis of rotation PA and the inflection point IP at a position along the X axis which meets the following condition:

$$X_{E1} < X_{PA} < X_{IP},$$

where $X_{E1}$ is defined as the distance between the first local extremum E1 and the blade leading edge 230 along the X axis, and where $X_{IP}$ is defined as the distance between the inflection point IP and the blade leading edge 230 along the X axis. The zero crossing NO of the profile centerline 250 can be located along the X axis with respect to the guide blade axis of rotation PA and the inflection point IP at a position which meets the following condition:

$$X_{PA} < X_{N0} < X_{IP},$$

where $X_{N0}$ is defined as the distance between the zero crossing NO and the blade leading edge 230 along the X axis, where $X_{PA}$ is defined as the distance between the axis of rotation PA and the blade leading edge 230 along the X axis, and where $X_{IP}$ is defined as the distance between the inflection point IP and the blade leading edge 230 along the X axis.

The guide blades 200 are adjustable between a first position 180 (see FIG. 7A), in particular a first end position, and a second position 190 (see FIG. 7B), in particular a second end position. Between the first and second positions 180, 190, a plurality of intermediate positions can be set. The first position 180 corresponds to a maximally open position of the guide device 100, in particular of the variable turbine geometry. The second position 190 corresponds to a minimally open position of the guide device 100, in particular of the variable turbine geometry. By this means, a fluid flow from the turbine inlet 13 can be variably guided through a flow duct (in the receiving chamber), i.e. where the guide blades 200 are arranged, to the turbine wheel 12. Formed between adjacent guide blades 200 are nozzle cross sections (also called intermediate duct) which are larger or smaller depending on the current position of the guide blades 200, and accordingly apply a greater or lesser amount of fluid of an internal combustion engine (e.g. exhaust gas) or of a fuel cell to the turbine wheel 12 mounted on the axis of rotation R in order, via the turbine wheel 12, to drive a compressor wheel 52 seated on the same shaft 30.

As described above, the chord length C is thus defined between the blade leading edge 230 (or the incident-flow edge) and the blade trailing edge 240 (or the outflow edge). The chord length C can be understood as meaning the distance of the profile chord 260 between the intersecting points $S_1$, $S_2$. The blade leading edge 230 can be understood as an incident-flow region of the guide blade 200 at maximum distance from the guide blade axis of rotation PA. The blade trailing edge 240 can be understood as an outflow region of the guide blade 200 at maximum distance from the guide blade axis of rotation PA. In other words, the blade trailing edge 240 is located in a flow direction along the guide blade 200, as seen downstream of the blade leading edge 230. A position of the guide blades 200 may also be referred to as a position or operating position. Thus, every possible position of a guide blade 200 during the operation of the turbine 10 is between the first position 180 at maximum passage/flow cross section (i.e. maximally open) and the second position 190 at minimum passage/flow cross section (i.e. minimally open or maximally closed). Every “possible position” can be understood as the position that can be provided during operation. A person skilled in the art knows that the operating positions change variably and automatically during the operation of the turbine 10 with the guide device 100 or the variable turbine geometry. In order to control the movement or the position of the guide blades 200, an actuating device 60 as described above can be provided, which can be designed as desired per se, for example can be electronic or pneumatic, to name just a pair of examples. The actuating device 60 can be an actuator. In the example of FIG. 1, the actuating device 60 is designed to be pneumatic with a control housing (for example a pressure capsule) and a plunger element that transmits the movement of the control housing via one or more intermediate elements, in particular via an adjusting shaft arrangement, to the guide device 100 or to the guide blades 200.

As also shown in FIGS. 2A to 3B, 7A and 7B, the guide device 100, in particular the variable turbine geometry 100, comprises an adjusting ring 120. The plurality of adjustable guide blades 200 are adjustable by means of a movement of the adjusting ring 120 in the circumferential direction 26 between the first position 180 and the second position 190. In particular, the adjusting device 60 is operatively coupled to the adjusting ring 120 and designed to move the adjusting ring 120 in the circumferential direction 26. The actuating device 60 is coupled to the adjusting ring 120 via one or more levers and/or a control rod.

Figure 6A:
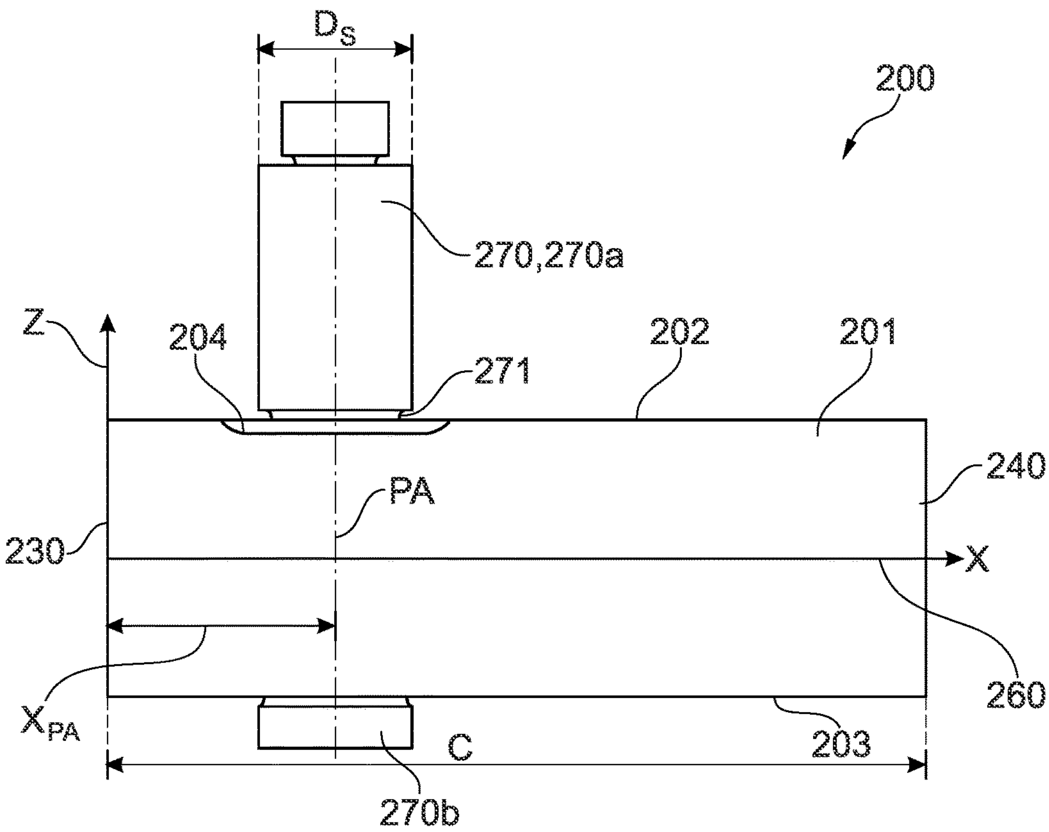
FIGS. 6A, 6B show a top view and a rear view of the guide blade from FIGS. 4A to 4C.
Figure 6B:
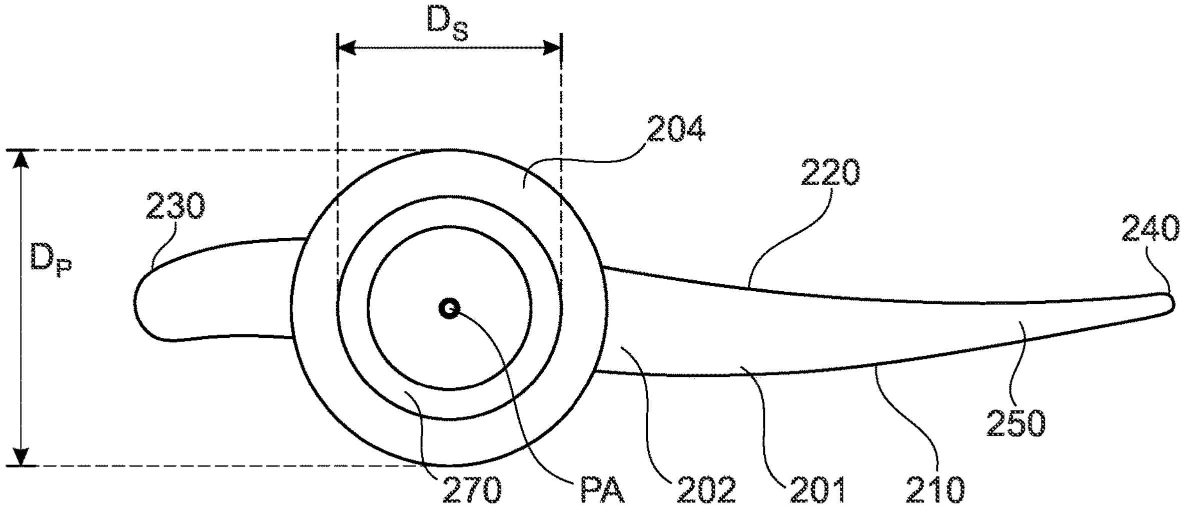
Figure 7A:
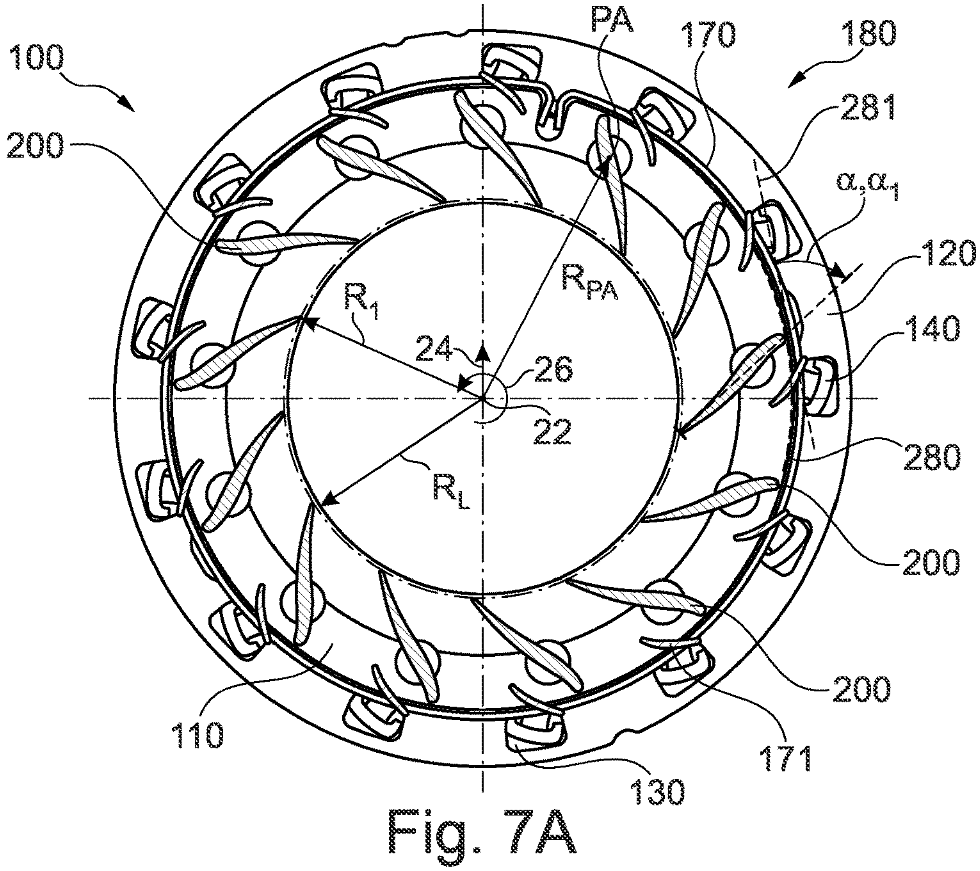
FIGS. 7A, 7B show a sectional view of the guide device from FIG. 3A (without cover disk and spacer elements) with the guide blades according to the invention in a fully open position and a fully closed position.
Figure 7B:
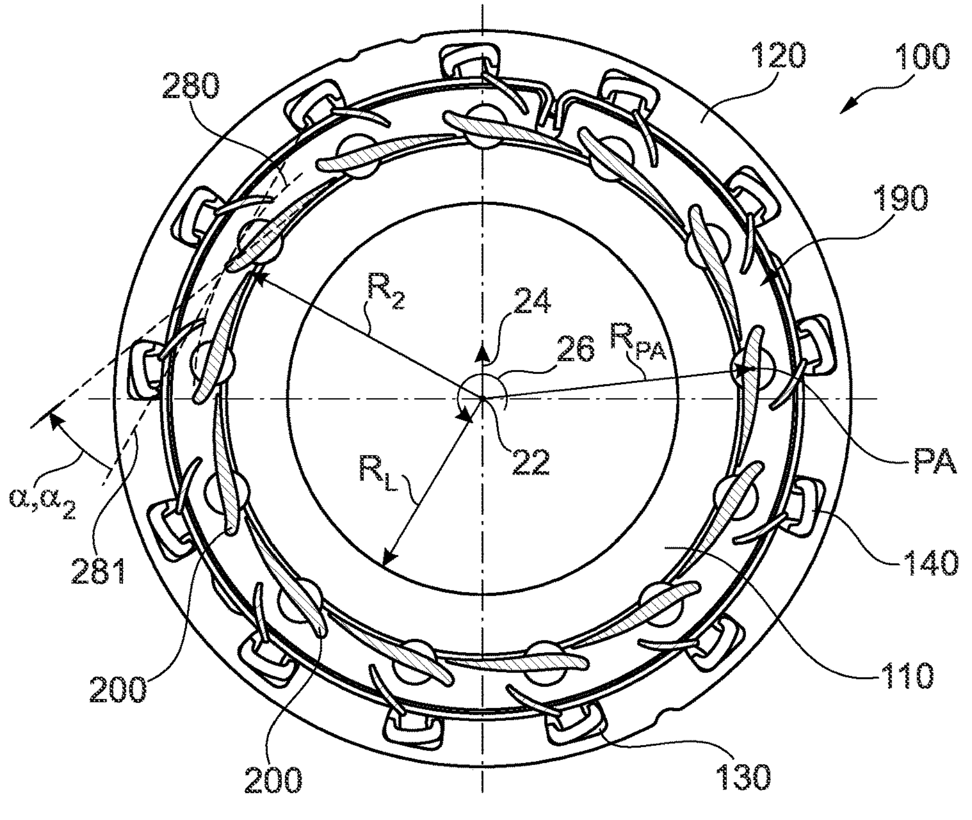

FIGS. 6A and 6B show a top view and a rear view of the guide blade 200 of FIGS. 4A to 4C. Each guide blade 200 comprises a blade shaft 270, which is coupled to the guide blade body 201 for conjoint rotation, in particular wherein the blade shaft 270 is formed in such a way that the guide blade 200 can be mounted rotatably via the blade shaft 270 in a blade bearing ring 110 of the guide device 100. A longitudinal axis or axis of rotation of the blade shaft 270 defines the guide blade axis of rotation PA. In other words, the plurality of guide blades 200 are each rotatably mounted in the blade bearing ring 110 via a blade shaft 270. The guide blades 200 are rotationally mounted in the blade bearing ring 110 and can be rotated or adjusted via the adjusting ring 120. In other words, the adjustable guide blades 200 can be mounted rotatably in the blade bearing ring 110 by means of the blade shafts 270 in a manner distributed uniformly in the circumferential direction 26. The blade shafts 270 extend in the axial direction 22, in particular parallel to the axis of rotation R. In other words, the guide blades 200 are rotationally mounted along a respective guide blade axis of rotation PA in the blade bearing ring 110, wherein the respective guide blade axis of rotation PA runs parallel to the axial direction 22 or axis of rotation R. An odd number of guide blades 200 can be provided. More than eight guide blades, in particular more than ten guide blades (e.g. 11 guide blades), preferably more than 12 guide blades can be provided. As shown in FIGS. 7A and 7B, precisely 13 guide blades 200 can be provided. In other embodiments, an even number of guide blades 200 can be provided.

With reference to FIGS. 6A and 6B, the guide blade body 201 can have a first side surface 202, wherein the blade shaft 270 on the first side surface 202 is connected to the guide blade body 201 for conjoint rotation. In embodiments, the guide blade 200, in particular the guide blade body 201, can have a disk-shaped stop portion 204 which is formed adjacent to the first side surface 202 and substantially concentric to the blade shaft 270. The stop portion 204 can have an (in particular maximum) diameter $D_P$, which is greater than a blade shaft diameter $D_S$ and/or a maximum profile thickness of the guide blade body 201. The stop portion 204 can have a diameter $D_P$, which is greater than an inner diameter of a through hole in the blade bearing ring 110, in which the blade shaft 270 can be mounted. By means of the stop portion 204 with diameter $D_P$ adjacent to the through hole in the blade bearing ring 110, gap losses can be reduced, as can deposits in the through hole, pressure losses and/or turbulence of the fluid flow. In addition, a defined stop of the guide blade body 201 to the blade bearing ring 110 can be provided. The blade shaft 270 and the guide blade body 201 can be configured integrally. The blade shaft 270 can have an undercut 271 adjacent to the first side surface 202. The undercut 271 should be understood to mean a comprehensive and in particular rotationally symmetrical removal of material. The undercut has a diameter which is smaller than the blade shaft diameter $D_S$. The undercut allows a defined mounting of the guide blade 200 with respect to the blade bearing ring 110 to be provided. As shown in FIG. 6A, the blade shaft 270 can be a first blade shaft 270*a*, which is connected to the guide blade body 201 on a first side surface 202 of the guide blade body for conjoint rotation. The guide blade 200 can have a second blade shaft 270*b*, which is coupled or connected, coaxially to the first blade shaft 270*a*, to the guide blade body 201 on a second side surface 203 of the guide blade body 201, which is opposite the first side surface 202, for conjoint rotation. The second blade shaft 270*b* has the same axis of rotation, in particular the guide blade axis of rotation PA, as the first blade shaft 270*a*. The second blade shaft 270*b* is designed to rotatably mount the guide blade 200 in a cover disk 150 (which is described in more detail below) of the guide device 100, in particular the variable turbine geometry, which is arranged opposite to the blade bearing ring 110. The cover disk 150 is arranged concentrically to the blade bearing ring and also has the axis of rotation R, 22. The guide blade 200 can be mounted in a more defined manner owing to being mounted on both sides, as a result of which tilting of the guide blade 200 during operation and gap losses can be reduced. In addition, higher absolute pressure levels, forces and/or moments acting on the guide blade 200 can be controlled. The cover disk 150 can have a blind hole or a through hole, which is designed to accommodate the second blade shaft 270*b* (it is useful in this design to have a corresponding hole provided in the cover disk 150 for each guide blade 200). In embodiments, the plurality of adjustable guide blades 200 can comprise the first and second blade shaft 270*a*, 270*b*. In other embodiments, only the two guide blades 200, which are closest in the turbine housing 11 to a respective supply duct 13*a*, 13*b* and a tongue end 14, 14*a*, 14*b*, have the first and second blade shafts 270*a*, 270*b*. As shown in FIG. 6A, the guide blade body 201 can have a width with a width direction Z, which runs between the first side surface 202 and the second side surface 203 orthogonally to the X axis (or parallel to the axis of rotation PA). As shown in the figs, the guide blade body 201 in the width direction Z between the first side surface 202 and the second side surface 203 can have a constant cross section. In other embodiments, the cross section of the guide blade body 201 in the width direction Z between the first side surface 202 and the second side surface 203 can vary.

Each guide blade 200 of the plurality of adjustable guide blades 200 is connected to one blade lever 140 each for conjoint rotation. Each blade lever 140 is at least partially received in each case in a coupling region 130 of the adjusting ring 120 for adjusting the respective guide blade 200. In other words, the blade levers 140 are operatively coupled to the adjusting ring 120 (see FIG. 2C). When the adjusting ring 120 rotates in the circumferential direction 26, the guide blades 200 can be adjusted. As described above, the guide blade bodies 201 are each connected to the respective blade shaft 270 at a first end of the blade shaft 270 for conjoint rotation. The blade lever 140 is connected to the blade shaft 270 at a second end of the blade shaft 130 opposite the first end. Each blade lever 140 can have a radial blade lever portion 141 which extends radially from the blade shaft 130. In addition, each blade lever 140 can have an axial blade lever portion 142, which extends axially from the radial blade lever portion 141 to the adjusting ring 120. In particular, the axial blade lever portion 142 can extend axially at least partially into the respective coupling region 130. The axial blade lever portion 142 can extend from the radial blade lever portion 141 predominantly parallel to the blade shaft 270. As shown in the FIGS., the blade levers 140 and the guide blades 200 can be arranged on opposite sides of the blade bearing ring 110.

With reference to FIGS. 7A and 7B, the guide blade 200 can be arranged in the blade bearing ring 110 such that an incident-flow angle $\alpha$ of the guide blade 200 lies in a range of $150 \leq \alpha \leq 65°$, in particular of $200 \leq \alpha \leq 60°$. The guide blade 200 (preferably each guide blade 200 of the plurality of guide blades 200) can have a first incident-flow angle $\alpha_1$ in the first position 180 (see FIG. 7A).

The guide blade 200 (preferably each guide blade 200 of the plurality of guide blades 200) can have a second incident-flow angle $\alpha_2$ in the second position 190 (see FIG. 7B), in particular wherein the first incident-flow angle $\alpha_1$ is greater than the second incident-flow angle $\alpha_2$. In embodiments, the first incident-flow angle $\alpha_1$ can be from 52° to 65°, in particular from 56° to 60°. In embodiments, the second incident-flow angle $\alpha_2$ can be from 15° to 30°, in particular from 23° to 27°. The respective incident-flow angle $\alpha$, $\alpha_1$, $\alpha_2$ is measured between the profile centerline 260 and a tangent 281 to a pitch circle 280 (with respect to the axis of rotation R, 22) at the blade leading edge 230. In this case, the respective pitch circle 280 (more specifically in the first position 180 and the second position 190) runs through the blade leading edge 230, in particular through the intersecting point $S_1$. The respective pitch circle tangent 281 runs (more specifically in the first position 180 and the second position 190) through the blade leading edge 230, in particular through the intersecting point $S_1$. In embodiments (not shown in the figs), the plurality of guide blades 200 can also be arranged in the blade bearing ring 110 such that individual guide blades 200 in the first position 180 and/or in the second position 190 have different incident-flow angles. For example, at least the two guide blades 200 which are nearest to a respective tongue end 14, 14*a*, 14*b* of two tongues of the turbine housing 11 have a larger or smaller angle of attack in comparison to the further guide blades 200, in the first position 180 and/or in the second position.

A first blade trailing edge distance $R_1$ in the first position 180 can be smaller than a second blade trailing edge distance $R_2$ in the second position 190. The first distance $R_1$ and the second distance $R_2$ can be measured in each case radially between the axial direction 22 and the blade trailing edge 240. The axial direction can correspond to an axis of rotation R of the turbine wheel 12. The blade bearing ring 110 can have an inner radius $R_L$. A ratio of the inner radius $R_L$ to the first distance $R_1$ and/or to the second distance $R_2$ can meet the following condition:

$$0.95 \leq R_L/R_1 \leq 0.995, \text{ in particular } 0.97 \leq R_L/R_1 \leq 0.99, \text{ and/or}$$

$$0.70 \leq R_L/R_2 \leq 0.80, \text{ in particular } 0.72 \leq R_L/R_2 \leq 0.78.$$

A guide blade axis of rotation distance $R_{PA}$ between the axial direction 22 and the guide blade axis of rotation PA of a guide blade 200 can be equal for each of the guide blades. In embodiments, the turbine wheel 12 can have a turbine wheel radius $R_{TR}$. A ratio of the turbine wheel radius $R_{TR}$ to the first distance $R_1$ can meet the following condition:

$$0.90 \leq R_{TR}/R_1 \leq 0.98, \text{ in particular } 0.94 \leq R_{TR}/R_1 \leq 0.97.$$

In embodiments, a ratio of the turbine wheel radius $R_{TR}$ to the second distance $R_2$ can meet the following condition:

$$0.65 \leq R_{TR}/R_2 \leq 0.80, \text{ in particular } 0.70 \leq R_{TR}/R_2 \leq 0.75.$$

As shown in FIGS. 2A, 2B, 3A and 3B and as described above, the guide device 100, in particular the variable turbine geometry 100, can comprise a cover disk 150 which is arranged parallel to the blade bearing ring 110 (as already mentioned above). The plurality of adjustable guide blades 200 can be arranged between the cover disk 150 and the blade bearing ring 110. The guide device 100 can also comprise a plurality of spacer elements 160, which are distributed in the circumferential direction 26 on the blade bearing ring 110 in such a way that they define an axial distance 161 of the blade bearing ring 110 from the cover disk 150 (see FIG. 2A). In particular, the plurality of spacer elements 160 can comprise at least three spacer elements 10. In embodiments, the cover disk 150 may also not be provided and the plurality of spacer elements 160 can define an axial distance 161 from a portion axially opposite the blade bearing ring 110 in the turbine housing 11. A minimum clearance for the adjustment of the guide blades 200 can be ensured by the spacer elements 160.

As indicated in FIGS. 2A, 2B, 7A and 7B, the guide device 100, in particular the variable turbine geometry, can further comprise an inlet guide grate 170 which circumferentially surrounds the blade bearing ring 110 and/or the plurality of adjustable guide blades 200. The inlet guide grate 170 can have a plurality of fixed inlet guide blades 171. The fixed inlet guide blades 171 can be arranged in each case between two adjacent, adjustable guide blades 200, in particular within an outer circumference of the guide device 100. The fixed inlet guide blades 171 are provided with a fixed angle of attack. In other words, the inlet guide blades 171 are not rotatable or adjustable. The inlet guide grate 170 can also replace the spacer elements 160 and ensure the axial distance 161 between the blade bearing ring 110 and the cover disk 150 (or a portion of the turbine housing 12). By means of the inlet guide grate 170, an improved incident flow to the guide blades 200 and/or the turbine wheel 12 can be provided.

As already described above, the guide device 100, in particular the variable turbine geometry, has an adjusting ring 120, which comprises a disk-shaped body (or annular body) and the plurality of coupling regions 130 are formed in the disk-shaped body. The coupling regions 130 are spaced apart in the circumferential direction 26. Each coupling region 130 is designed to at least partially accommodate a blade lever 140 for adjusting a guide blade 120 of a guide device 100. As shown in FIGS. 2A to 3A, each blade lever 140 is at least partially accommodated in a respective coupling region 130 for adjusting the respective guide blade 120. In other words, the respective blade levers 140 are in engagement with one coupling region 130 each, and therefore, in a movement of the adjusting ring 200, in particular in the circumferential direction 26, this movement can be transmitted to the blade levers 140 and thus to the adjustable guide blades 200. In particular, rotation of the adjusting ring 200 in the circumferential direction 26 leads to rotation of the respective guide blades 200 about their respective guide blade axis of rotation PA, and in particular to an adjustment of the respective guide blades 200 between the first position 180 and the second position 190. In the embodiments shown, "partially accommodated" means that the respective blade lever 140 extends in the respective coupling region 220, in particular in the axial direction 22, in such a way that a transmission of force between the adjusting ring 200 and the blade levers 140 can take place during a movement of the adjusting ring 120 in the circumferential direction 26.

Each coupling region 130 can be completely surrounded by the disk-shaped body (see, for example, FIG. 2C). In other words, each coupling region can be formed as a passage 131 with a circumferential wall 132 in the adjusting ring 120. In particular, the respective coupling region 130 in the adjusting ring 200 can extend in the axial direction 22. If the coupling regions 130 with the circumferential wall 131 (i.e. completely surrounded by the disk-shaped body) are provided, the robustness of the adjusting ring 120 can be increased. In addition, a plurality of functions can thus be integrated in the adjusting ring 120, such as, for example, the adjustment of the blade lever 140 in the circumferential direction 26, the provision of a first stop for the first position 180 (see above) and/or a second stop for the second position 190 (see above) for the adjustment of the guide device 100, and a radial bearing 112 of the adjusting ring 120 in the guide device 100.

The circumferential wall 132 has lateral wall portions which extend substantially in the radial direction 24. Based on the two lateral wall portions ("on the left" and "on the right" in the passage 131 in FIG. 2C), the plurality of guide blades 200 can be adjusted during a movement of the adjusting ring 120 in the circumferential direction 26 relative to the blade bearing ring 110. Especially on said two lateral wall portions, wear due to the contact of the blade levers with the lateral wall portions can be reduced by the design according to the invention of the guide blade 200. A radially internal wall portion of the circumferential wall 131 can provide a first stop for the first position 180. The radially internal wall portion can also provide the second stop for the second position 190. More specifically, when adjusting the adjusting ring 120 in the circumferential direction 26 from a certain adjustment angle (clockwise or counterclockwise), measured with respect to the axis of rotation R between the first position 180 and the second position 190, the respective blade lever 140 in the coupling region 130 can enter into contact with the inner wall portion. Thus, a further adjustment of the plurality of guide blades 140 in the circumferential direction 26 can be limited. In addition, a radial mounting of the adjusting ring 130 can take place by rolling of the blade lever 140 (in particular on an outside of the axial blade lever portion 142 with respect to the axis of rotation R) on a radially external wall portion of the circumferential wall. In other words, a radial rolling mounting can thus be provided between the respective axial blade lever portions 142 and the respective radially external wall portions. An axial mounting of the adjusting ring 120 can take place via the blade bearing ring 110. In particular, the blade bearing ring 110 can have a bearing 112 on a side 111 facing away from the plurality of adjustable guide blades 200 in order to mount the adjusting ring 120 axially. The adjusting ring 120 can be arranged predominantly radially outside the blade bearing ring 110 (see, for example, FIG. 2C).

As shown for example in FIGS. 2A and 2B, the turbine 10 can comprise a clamping means 500 which is arranged in the axial direction 22 between the guide device 100, in particular the blade bearing ring 110, and the turbine rear wall 16. The clamping means 500 can be designed to clamp the guide device 100 against the turbine housing 11, in particular in the axial direction 22. The clamping means 500 can be designed as a disk spring. The clamping means 300 has a radially outer end and a radially inner end. The clamping means 500 can abut at its radially outer end against the blade bearing ring 110 and can abut at its radially inner end against the turbine rear wall 16. In addition, the turbine 10 can comprise a heat shield 600. Heat transfer from the turbine 10 to the bearing housing 40 and/or to the compressor 50 can be reduced by the heat shield 600. The heat shield 600 can be arranged in the axial direction 22 between the turbine wheel 12 and the bearing housing 40, in particular between the guide device 100 and the bearing housing 40. More specifically, the heat shield 600 can be clamped between the clamping means 500 and the blade bearing ring 110. In particular, the heat shield 600 can be clamped between the blade bearing ring 110 and the radially outer end of the clamping means 500. The clamping means 500 can lie in an indirectly contacting manner against the blade bearing ring 110 via the heat shield 600. The clamping means 500 can form a linear contact with the bearing housing 40 and form a surface contact with the heat shield 600, in particular at its radially outer end. In alternative embodiments, the clamping means 500 can, however, also lie in a directly contacting manner against the blade bearing ring 110. Based on the spacer elements 160 and/or the inlet guide grate 170, the prestressing force generated by the clamping means 500 can be transmitted axially from the blade bearing ring 110 to the turbine housing 11 or, if available, to the cover disk 150.

As described above, the guide device 100, in particular the variable turbine geometry, comprises at least one (optimized) guide blade 200 according to the invention, which is mounted rotatably and adjustably in the blade bearing ring 110 via a blade shaft 270. In special embodiments, the guide device 100 may, in addition to the at least one optimized guide blade 200, also have at least one other (or non-optimized) guide blade, for example at least one fixed guide blade (i.e. a guide blade which is connected to the blade bearing ring 110 for conjoint rotation) or at least one guide blade which does not have the features described above. In preferred embodiments, however, the guide device 100 can comprise the plurality of adjustable (optimized) guide blades 200, wherein each guide blade 200 of the plurality of guide blades 200 is rotatably and adjustably mounted in the blade bearing ring 110 via a blade shaft 270. In one example, at least two optimized guide blades 200 can be provided. In this case, for example, only the two guide blades 200, which lie closest in the turbine housing 11 to a respective one of the two supply ducts 13*a*, 13*b* (or tongue ends 14, 14*a*, 14*b* of the supply ducts), are configured as optimized guide blades 200 according to the present invention. In particularly preferred embodiments, all the guide blades 200 of the guide device 100 are designed according to the present invention (i.e. as optimized guide blades 200). Although the guide blades 200 are oriented counterclockwise in all the figures (that is, the respective leading edges of the blades are oriented counterclockwise), they can of course also be oriented clockwise (that is, the respective leading edges of the blades are oriented clockwise). Although the guide device 100 is substantially annular and the guide blades 200 are shown spaced apart from one other in the circumferential direction 26, the guide device 100 can also be provided in other embodiments in such a way that the guide blades 200 according to the invention are arranged (substantially) linearly next to one other and spaced apart from one other. Of course, the other components of the guide device 100 are adapted accordingly in such an embodiment.

Figure 9:
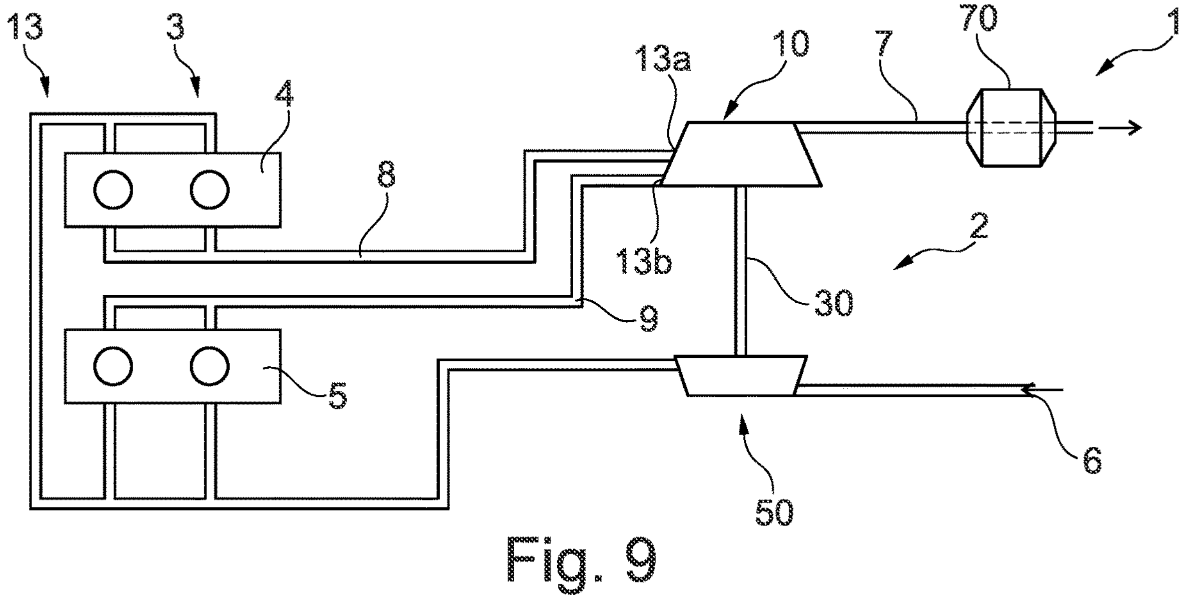
FIG. 9 shows a schematic representation of an engine system with the turbine from FIG. 8.

FIG. 9 shows a schematic view of an engine system 1 with the supercharging device 2 from FIG. 1, which comprises the turbine 10 with the guide device 100, in particular the variable turbine geometry, and the guide blades 200 according to the invention. The engine system 1 comprises an internal combustion engine 3 with a plurality of cylinders. The turbine inlet 13 of the turbine 11 is fluidically connected to the cylinders downstream of the internal combustion engine 3. The plurality of cylinders can form a first cylinder group 4 and a second cylinder group 5. In particular, the first cylinder group 4 can be arranged on a first cylinder bank. The second cylinder group 5 can be arranged on a second cylinder bank. In embodiments, a plurality of cylinders can form the first cylinder group 4. In embodiments, a plurality of cylinders can form the second cylinder group 5. Even if in FIG. 9 two cylinders are shown as the first cylinder group 4 (in particular on a first cylinder bank), and two further cylinders are shown as the second cylinder group 5 (in particular on a second cylinder bank), only one cylinder can be provided per cylinder group 4, 5 or cylinder bank or else more than two cylinders can in each case be provided. In embodiments, the first cylinder group 4 and the second cylinder group 5 each have a plurality of cylinders each with a combustion chamber (or a combustion space). The combustion chamber or the combustion space is the space adjacent to a piston into which an air-fuel mixture is introduced, ignited and burned. In embodiments, the first supply duct 13*a* of the turbine 10 downstream of the internal combustion engine 1 can be fluidically connected to the first cylinder group 4 and the second supply duct 13*b* downstream of the internal combustion engine 1 can be fluidically connected to the second cylinder group 5.

The compressor 50 can be arranged upstream of the internal combustion engine 1 and can also be fluidically connected to the first and second cylinder group 4, 5, in particular the cylinders. Between compressor 50 and internal combustion engine 1, a charge-air cooler can be arranged (not shown in the FIGS.). Compressed fluid can be cooled by the charge-air cooler. An exhaust gas purification 70, in particular a catalytic converter, can be arranged downstream of the turbine 10. An exhaust gas throttle valve can be provided downstream of the catalytic converter 70 (not shown). In addition, exhaust gas recirculation can be provided (also not shown).

As shown in FIG. 9, the engine system 1 can comprise an inlet duct 6, which is arranged upstream of the internal combustion engine 3 and is fluidically connected to the respective cylinders (in particular the combustion chambers) in order to supply the combustion chambers with fluid, in particular inlet air. Furthermore, the engine system 1 can comprise an outlet duct 7 which is arranged downstream of the internal combustion engine 3 and is connected to the respective cylinders, in particular the combustion chambers, in order to discharge fluid, in particular exhaust gas, from the cylinders. In particular, the inlet air can be ambient air, for example at atmospheric pressure. The inlet duct can have an atmosphere-side inlet 6*a*. As shown in FIG. 9, the outlet duct 7 can have a first outlet partial duct 8, which is fluidically connected to cylinders of the first cylinder group 4. In addition, the outlet duct 7 can have a second outlet partial duct 9, which is fluidically connected to the cylinders of the second cylinder group 5. In particular, the turbine 10 can be arranged in the outlet duct 7. In this case, the first supply duct 13*a* can be fluidically connected to the first outlet partial duct 8. The second supply duct 13*b* can be fluidically connected to the second outlet partial duct 9. During operation, fluid, in particular exhaust gas, can be guided via the at least one guide blade 200, in particular the plurality of guide blades 200, to the turbine wheel 12. The compressor 50 can be arranged in the inlet duct 6.

Although the present invention has been described above and defined in the appended claims, it should be understood that the invention may alternatively also be defined in accordance with the following embodiments:

1. A guide blade (200) for a guide device (100), comprising:
   - a guide blade body (201) with a blade top side (210), a blade underside (220), a blade leading edge (230) and a blade trailing edge (240),
   - a profile centerline (250) which is defined in a profile of the guide blade body (201) by the blade top side (210) and the blade underside (220) and runs between them from the blade leading edge (230) to the blade trailing edge (240), the profile centerline (250) having a turning point (IP),
   - wherein the blade leading edge (230) and the blade trailing edge (240) are connected by a profile chord (260),
   - wherein the guide blade (200) has a guide blade axis of rotation (PA), and
   - wherein the axis of rotation (PA), starting from the blade leading edge (230) in the direction of the blade trailing edge (240), lies along the profile chord (260) between the blade leading edge (230) and the inflection point (IP).

2. The guide blade (200) according to embodiment 1, wherein the profile chord (260) defines a chord length (C), in particular wherein the profile chord (260) runs as a linear connection between the blade leading edge (230) and the blade trailing edge (240).

3. The guide blade (200) according to embodiment 1 or embodiment 2, wherein the profile chord (260) in each case forms an intersecting point ($S_1$, $S_2$) with the blade leading edge (230) and the blade trailing edge (240), in particular at which intersecting point the blade leading edge (230) and the blade trailing edge (240) each have a surface point with a smallest radius.

4. The guide blade (200) according to embodiment 2 or embodiment 3, wherein the profile chord (260) defines an X axis of a coordinate system (X, Y), wherein the X axis extends along the profile chord (260) and from the blade leading edge (230) to the blade trailing edge (240), in particular wherein the chord length (C) is measured parallel to the profile chord (260) and between the respective intersecting points ($S_1$, $S_2$) of the profile chord (260) with the blade leading edge (230) and the blade trailing edge (240).

5. The guide blade (200) according to embodiment 4, wherein the blade leading edge (230) is at X=O, and wherein the blade trailing edge (240) is at X=C.

6. The guide blade (200) according to embodiment 4 or embodiment 5, wherein the axis of rotation (PA) is located along the X axis at a position which meets the following condition:

$$0.20 \le X_{PA}/C \le 0.35, \text{preferably } 0.21 \le X_{PA}/C \le 0.32 \text{ and in particular}$$

$$0.23 \le X_{PA}/C \le 0.31,$$

where $X_{PA}$ is defined as the distance between the axis of rotation (PA) and the blade leading edge (230) along the X axis.

7. The guide blade (200) according to any one of the embodiments 4 to 6, wherein a Y axis of the coordinate system (X, Y) is defined orthogonally to the X axis and runs through an intersecting point of the profile chord (260) with the blade leading edge (230).

8. The guide blade (200) according to embodiment 7, wherein the axis of rotation (PA) is located along the Y axis at a position which meets the following condition:

$Y_{PA} \le 0$, in particular $-0.005 \le Y_{PA}/C \le 0$, preferably $-0.004 \le Y_{PA}/C \le 0$, where $Y_{PA}$ is defined as the distance between the axis of rotation (PA) and the profile chord (260) along the Y axis.

9. The guide blade (200) according to embodiment 7, wherein the axis of rotation (PA) is located along the X axis and the Y axis at a position which meets the following condition:

$$0.20 \le X_{PA}/C \le 0.35 \text{ and } -0.005 \le Y_{PA}/C \le 0,$$

$$\text{in particular } 0.23 \le X_{PA}/C \le 0.31 \text{ and } -0.004 \le Y_{PA}/C \le 0,$$

where $X_{PA}$ is defined as the distance between the axis of rotation (PA) and the blade leading edge (230) along the X axis, and where $Y_{PA}$ is defined as the distance between the axis of rotation (PA) and the profile chord (260) along the Y axis.

10. The guide blade (200) according to any one of embodiments 4 to 9, wherein the inflection point (IP) is located along the X axis at a position which meets the following condition:

$$X_{PA} \le X_{IP}, \text{ preferably } 0.35 \le X_{IP}/C \le 0.6 \text{ and in particular } 0.40 \le X_{IP}/C \le 0.45,$$

where $X_{IP}$ is defined as the distance between the inflection point (IP) and the blade leading edge (230) along the X axis.

11. The guide blade (200) according to any one of embodiments 4 to 10, wherein a distance ($X_A$) between the inflection point (IP) and the axis of rotation (PA) along the X axis meets the following condition:

$$0.05 \le X_A/C \le 0.25, \text{ preferably } 0.07 \le X_A/C \le 0.22 \text{ and in particular}$$

$$0.09 \le X_A/C \le 0.20,$$

where $X_A$ is defined as the distance between the inflection point (IP) and the axis of rotation (PA) along the X axis.

12. The guide blade (200) according to any one of embodiments 7 to 11, wherein the inflection point (IP) is located along the Y axis at a position which meets the following condition:

$$0 \le Y_{IP}, \text{ in particular } 0 \le Y_{IP}/C \le 0.02, \text{ preferably } 0.01 \le Y_{IP}/C \le 0.015,$$

where $Y_{IP}$ is defined as the distance between the inflection point (IP) and the profile chord (260) along the Y axis.

13. The guide blade (200) according to any one of embodiments 7 to 12, wherein a distance ($Y_A$) between the inflection point (IP) and the axis of rotation (PA) along the Y axis meets the following condition:

$$Y_{PA} \le Y_{IP}, \text{ in particular } 0.005 \le Y_A/C \le 0.02, \text{ preferably } 0.012 \le Y_A/C \le 0.018,$$

where $Y_A$ is defined as the distance between the inflection point (IP) and the axis of rotation (PA) along the Y axis.

14. The guide blade (200) according to any one of the preceding embodiments, wherein the blade top side (210) and the blade underside (220) are designed such that the profile centerline (250) has an undulating form with the inflection point (IP).

15. The guide blade (200) according to any one of the preceding embodiments, wherein the blade top side (210) and/or the blade underside (220) have/has an undulating form.

16. The guide blade (200) according to any one of the preceding embodiments, wherein the blade top side (210) and/or the blade underside (220) have/has a concave portion (211*a*, 221*a*) and a convex portion (211*b*, 221*b*) with respect to the profile chord (260).

17. The guide blade (200) according to embodiment 16, wherein the blade top side (210), starting from the blade leading edge (230) in the direction of the blade trailing edge (240) and with respect to the profile chord (260), has a concave portion (211*a*) followed by a convex portion (211*b*), and/or wherein the blade underside (220), starting from the blade leading edge (230) in the direction of the blade trailing edge (240) and with respect to the profile chord (260), has a convex portion (221*a*) followed by a concave portion (221*b*).

18. The guide blade (200) according to any one of the preceding embodiments, wherein the profile centerline (250) has precisely one turning point (IP).

19. The guide blade (200) according to any one of the preceding embodiments, wherein the profile centerline (250) has an undulating form with two oppositely curved regions (251*a*, 251*b*).

20. The guide blade (200) according to embodiment 19, wherein the profile centerline (250) has a first curved region (251*a*) and a second curved region (251*b*), between which the inflection point (IP) is defined.

21. The guide blade (200) according to any one of the preceding embodiments 7 to 20, wherein the profile centerline (250) at the blade leading edge (230) has the values X=0 and Y=0 and at the blade trailing edge (240) the values X=C and Y=O, and in particular wherein the profile centerline (250) has a course which is free of kinks.

22. The guide blade (200) according to any one of the preceding embodiments 7 to 21, wherein the profile centerline (250) between the blade leading edge (230) and a zero crossing (NO) has negative Y values, wherein the zero crossing (NO) is defined as an intersecting point between the profile centerline (250) and the profile chord (260).

23. The guide blade (200) according to embodiment 22, wherein the profile centerline (250) between the zero crossing (X0) and the blade trailing edge (240) has positive Y values.

24. The guide blade (200) according to any one of the preceding embodiments, wherein the profile centerline (250) defines a first local extremum (E1) between the blade leading edge (230) and the inflection point (IP), and wherein the profile centerline (250) defines a second local extremum (E2) between the inflection point (IP) and the blade trailing edge (240), in particular the first local extremum (E1) being a low point and the second local extremum (E2) being a high point.

25. The guide blade (200) according to embodiment 24, if dependent on embodiments 2 and 4, wherein the first local extremum (E1) and the second local extremum (E2) are located along the X axis at a position which meets the following condition:

$X_{E1} \leq X_{E2}$, and/or $0.08 \leq X_{E1}/C \leq 0.17$, in particular $0.11 \leq X_{E1}/C \leq 0.14$, and/or $0.50 \leq X_{E2}/C \leq 0.80$, in particular $0.60 \leq X_{E2}/C \leq 0.70$, where $X_{E1}$ is defined as the distance between the first local extremum (E1) and the blade leading edge (230) along the X axis, and wherein $X_{E2}$ is defined as the distance between the second local extremum (E2) and the blade leading edge (230) along the X axis.

26. The guide blade (200) according to embodiment 24 or embodiment 25, if dependent on embodiment 4, wherein the first local extremum (E1) is located with respect to the axis of rotation (PA) and the inflection point (IP) along the X axis at a position which meets the following condition:

$X_{E1} \leq X_{PA} \leq X_{IP}$, where $X_{E1}$ is defined as the distance between the first local extremum (E1) and the blade leading edge (230) along the X axis, and where $X_{IP}$ is defined as the distance between the inflection point (IP) and the blade leading edge (230) along the X axis.

27. The guide blade (200) according to any one of embodiments 22 to 26, if dependent on embodiment 4, wherein the zero crossing (NO) of the profile centerline (250) is located with respect to the axis of rotation (PA) and the inflection point (IP) along the X axis at a position which meets the following condition:

$X_{PA} \leq X_{N0} \leq X_{IP}$, where $X_{N0}$ is defined as the distance between the zero crossing (NO) and the blade leading edge (230) along the X axis, where $X_{PA}$ is defined as the distance between the axis of rotation (PA) and the blade leading edge (230) along the X axis, and where $X_{IP}$ is defined as the distance between the inflection point (IP) and the blade leading edge (230) along the X axis.

28. The guide blade (200) according to any one of the preceding embodiments, wherein an incident-flow angle (a) of the guide blade (200) is in a range of $15° \leq \alpha \leq 65°$.

29. The guide blade (200) according to any one of the preceding embodiments, wherein the guide blade (200) has a blade shaft (270) which is coupled to the guide blade body (201) for conjoint rotation, in particular wherein the blade shaft (270) is formed in such a way that the guide blade (200) can be mounted rotatably via the blade shaft (270) in a blade bearing ring (110) of a guide device (100), in particular of a variable turbine geometry.

30. The guide blade (200) according to embodiment 29, wherein the guide blade body (201) has a first side surface (202), and wherein the blade shaft (270) is connected on the first side surface (202) to the guide blade body (201) for conjoint rotation.

31. The guide blade (200) according to embodiment 30, wherein the guide blade body (201) has a disk-shaped stop portion (204) which is formed adjacent to the first side surface (202) and substantially concentric to the blade shaft (270).

32. The guide blade according to embodiment 31, wherein the stop portion (204) has a diameter ($D_P$) which is larger than a blade shaft diameter ($D_S$) and/or a maximum profile thickness of the guide blade body (201).

33. The guide blade (200) according to any one of the embodiments 30 to 32, wherein the blade shaft (270) has an undercut (271) adjacent to the first side surface (202).

34. The guide blade (200) according to any one of embodiments 29 to 33, wherein the blade shaft (270) is a first blade shaft (**270*a*), which is connected to the guide blade body (201) on a first side surface (202) of the guide blade body for conjoint rotation, and wherein the guide blade (200) has a second blade shaft (270*b*), which is coupled, coaxially to the first blade shaft (270*a*), to the guide blade body (201) on a second side surface (203) of the guide blade body (201), which is opposite the first side surface (202**), for conjoint rotation.

35. A guide device (100), comprising:

a blade bearing ring (110), and at least one guide blade (200) according to any one of the preceding embodiments, wherein the at least one guide blade (200) is mounted via a blade shaft (270) rotatably and adjustably in the blade bearing ring (110), in particular comprising a plurality of guide blades (200) according to any one of the preceding embodiments, wherein each guide blade (200) of the plurality of guide blades (200) is mounted via a blade shaft (270) rotatably and adjustably in the blade bearing ring (110).

36. The guide device (100) according to embodiment 35, further comprising an adjusting ring (120) which has a plurality of coupling regions (130) which are in each case spaced apart from one another in the circumferential direction (26) in the adjusting ring (120), wherein each guide blade (200) of the plurality of guide blades (200) is connected in each case to a blade lever (140) for conjoint rotation, and in particular wherein each blade lever (140) is at least partially accommodated in a respective coupling region (130) for adjusting the respective guide blade (200).

37. The guide device (100) according to embodiment 35 or embodiment 36, wherein each coupling region (130) is formed as a passage (131) with a circumferential wall (132) in the adjusting ring (120).

38. The guide device (100) according to embodiment 36 or embodiment 37, wherein the guide blade body (201) is connected to the blade shaft (270) at a first end of the blade shaft (270) for conjoint rotation, and wherein the respective blade lever (140) is connected to the blade shaft (270) at a second end of the blade shaft (270) opposite the first end for conjoint rotation.

39. The guide device (100) according to any one of embodiments 35 to 38, wherein each blade lever (140) has a radial blade lever portion (141) which extends radially from the blade shaft (140), and an axial blade lever portion (142) which extends axially from the radial blade lever portion (141) to the adjusting ring (120), in particular wherein the axial blade lever portion (140) extends axially at least partially into the respective coupling region (130).

40. The guide device (100) according to any one of embodiments 35 to 39, further comprising a cover disk (150) which is arranged parallel to the blade bearing ring (110), wherein the plurality of adjustable guide blades (200) are arranged between the cover disk (150) and the blade bearing ring (110).

41. The guide device (100) according to embodiment 40, wherein the blade shaft (270) is a first blade shaft (270*a*) and has a blade axis which defines the guide blade axis of rotation (PA), and wherein the guide blade (200) defines a second blade shaft (270*b*) which is connected opposite the first blade shaft (270*a*) to the guide blade body (201) for conjoint rotation, wherein the second blade shaft (270*b*) is mounted rotatably in the cover disk (150).

42. The guide device (100) according to any one of embodiments 35 to 41, wherein the adjustable guide blades (200) are mounted rotatably via the blade shafts (270) in the blade bearing ring (110) so as to be uniformly distributed in the circumferential direction (26).

43. The guide device (100) according to any one of embodiments 35 to 42, wherein the guide device (100) has an odd number of adjustable guide blades (200).

44. The guide device (100) according to any one of embodiments 40 to 43, wherein the guide device (100) has a plurality of spacer elements (160) which are distributed in the circumferential direction (26) on the blade bearing ring (110) in such a manner that they define an axial distance (161) of the blade bearing ring (110) from the cover disk (150), in particular wherein the plurality of spacer elements (160) comprise at least three spacer elements (160).

45. The guide device (100) according to any one of embodiments 35 to 44, wherein the plurality of adjustable guide blades (200) are adjustable between a first position (180) corresponding to a maximally open position of the guide device (100), and a second position (190) corresponding to a minimally open position of the guide device (100), in particular by means of a movement of the adjusting ring (130) in the circumferential direction (26).

46. The guide device (100) according to embodiment 45, wherein the guide device (100) defines an axial direction (22), and wherein a first blade trailing edge distance ($R_1$) in the first position (180) is smaller than a second blade trailing edge distance ($R_2$) in the second position (190), wherein the first distance ($R_1$) and the second distance ($R_2$) are each measured radially between the axial direction (22) and the blade trailing edge (240).

47. The guide device (100) according to embodiment 46, wherein the blade bearing ring (110) defines an inner radius ($R_L$), and wherein for a ratio of the inner radius ($R_L$) to the first distance ($R_1$) and/or to the second distance ($R_2$) the following condition applies:

$$0.95 \le R_L/R_1 \le 0.995, \text{ in particular } 0.97 \le R_L/R_1 \le 0.99,$$
and/or $$0.70 \le R_L/R_2 \le 0.80, \text{ in particular } 0.72 \le R_L/R_2 \le 0.78.$$

48. The guide device (100) according to any one of embodiments 45 to 47, wherein the guide blade (200) in the first position (180) has a first incident-flow angle (al), and wherein the guide blade (200) in the second position (190) has a second incident-flow angle (α2), in particular wherein the first incident-flow angle (α1) is greater than the second incident-flow angle (α2).

49. The guide device (100) according to any one of embodiments 35 to 48, further comprising an actuating device (60) which is operatively coupled to the adjusting ring (120) and is designed to move the adjusting ring (120) in the circumferential direction (26), in particular wherein the actuating device (60) is coupled to the adjusting ring (120) via one or more levers and/or a control rod.

50. The guide device (100) according to any one of embodiments 35 to 49, wherein the guide device (100) further comprises an inlet guide grate (170) which circumferentially surrounds the blade bearing ring (110) and/or the plurality of adjustable guide blades (200), wherein the inlet guide grate (170) has a plurality of fixed, flow-optimized spacer bodies (171), wherein the fixed, flow-optimized spacer bodies (171) are each arranged between two adjacent adjustable guide blades (200), in particular adjacent to the outer circumference (101) of the guide device (100).

51. The guide device (100) according to any one of embodiments 35 to 50, wherein the guide device (100) is a variable turbine geometry.

52. A turbine (10) for a supercharging device (2), comprising:

- a turbine housing (11),
- a turbine wheel (12), which is arranged in the turbine housing (11), and
- a guide device (100), in particular a variable turbine geometry, according to any one of embodiments 35 to 51, which is arranged radially outside the turbine wheel (12) in the turbine housing (11) and circumferentially surrounds the turbine wheel (12).

53. The turbine (10) according to embodiment 52, wherein the turbine housing (11) comprises a turbine inlet (13), a turbine outlet (14) and a receiving chamber (15), which is arranged between the turbine inlet (13) and the turbine outlet (14) and fluidically with the turbine inlet (13) and the turbine outlet (14), and wherein the turbine wheel (12) is arranged in the receiving chamber (15).

54. The turbine (10) according to embodiment 52 or embodiment 53, wherein the plurality of adjustable guide blades (200) are adjustable between a first position (180) corresponding to a maximally open position of the guide device (100), and a second position (190) corresponding to a minimally open position of the guide device (100).

55. The turbine (10) according to any one of embodiments 52 to 54, wherein the turbine (10) defines an axial direction (22), and wherein a first blade trailing edge distance ($R_1$) in the first position is smaller than a second blade trailing edge distance ($R_2$) in the second position, wherein the first distance ($R_1$) and the second distance ($R_2$) are each measured radially between the axial direction (22) and the blade trailing edge (240).

56. The turbine (10) according to embodiment 55, wherein the turbine wheel (12) has a turbine wheel radius ($R_{TR}$), wherein a ratio of the turbine wheel radius ($R_{TR}$) to the first distance ($R_1$) meets the following condition:

$$0.90 \le R_{TR}/R_1 \le 0.98, \text{ in particular } 0.94 \le R_{TR}/R_1 \le 0.97.$$

57. The turbine (10) according to embodiment 55 or embodiment 56, wherein the turbine wheel (12) has a turbine wheel radius ($R_{TR}$), wherein a ratio of the turbine wheel radius ($R_{TR}$) to the second distance ($R_2$) meets the following condition:

$$0.65 \le R_{TR}/R_2 \le 0.80, \text{ in particular } 0.70 \le R_{TR}/R_2 \le 0.75.$$

58. The turbine (10) according to any of one of embodiments 52 to 57, wherein the turbine (10) is a radial turbine.

59. The turbine (10) according to any one of embodiments 52 to 58, further comprising a clamping means (500), wherein the clamping means (500) is arranged in the axial direction (22) between the guide device (100), in particular the blade bearing ring (110), and a turbine rear wall (15), in particular wherein the clamping means (500) is designed to clamp the guide device (100) against the turbine housing (11).

60. The turbine (10) according to embodiment 59, wherein the clamping means (500) abuts at its radially outer end against the blade bearing ring (110) and abuts at its radially inner end against the turbine rear wall (16).

61. The turbine (10) according to embodiment 58 or embodiment 59, wherein a heat shield (600) is clamped between the clamping means (500) and the blade bearing ring (110).

62. The turbine (10) according to any one of embodiments 59 to 61, wherein the turbine rear wall (16) is formed as part of a bearing housing (40).

63. The turbine (10) according to any one of embodiments 53 to 62, wherein the turbine inlet (13) comprises a first supply duct (13*a*) and a second supply duct (13*b*), which are arranged spaced from each other in the circumferential direction (26).

64. A supercharging device (2) for an internal combustion engine (3) or a fuel cell, comprising: a bearing housing (40),
- a shaft (30) that is rotatably mounted in the bearing housing (40),
- a compressor (50) with a compressor wheel (52), and
- a turbine (10) according to any one of embodiments 52 to 63, wherein the turbine wheel (12) and the compressor wheel (52) are coupled to the shaft (30) at opposite ends of the shaft (30) for conjoint rotation.

65. The supercharging device (2) according to embodiment 64, wherein the compressor (50) comprises a compressor housing (51) in which the compressor wheel (52) is arranged, wherein the bearing housing (40) is coupled to the turbine housing (12) and to the compressor housing (52).

66. The supercharging device (2) according to embodiment 64 or embodiment 65, further comprising an electric motor, which is arranged in an engine compartment in the bearing housing (40), wherein the turbine wheel (12) and/or the compressor wheel (52) are/is coupled to the electric motor via the shaft (30).

67. An engine system (1), comprising:
- an internal combustion engine (3) with a plurality of cylinders, and
- a supercharging device (2) according to any one of embodiments 64 to 66, wherein a turbine inlet (13) of the turbine housing (11) downstream of the internal combustion engine (3) is fluidically connected to the plurality of cylinders.

68. The engine system (1) according to embodiment 67, wherein the plurality of cylinders form a first cylinder group and a second cylinder group, and wherein the turbine inlet (13) comprises a first supply duct (13*a*) and a second supply duct (13*b*), which are spaced apart from each other in the circumferential direction (26), wherein the first cylinder group is fluidically connected to the first supply duct (13*a*), and wherein the second cylinder group is fluidically connected to the second supply duct (13*b*).

69. The engine system (1) according to embodiment 68, wherein the first cylinder group (4) and the second cylinder group (5) each have a plurality of cylinders each having a combustion chamber, in particular wherein the first cylinder group (4) is arranged on a first cylinder bank and the second cylinder group (5) is arranged on a second cylinder bank.

70. The engine system (1) according to any one of embodiments 67 to 69, further comprising an inlet duct (6), which is arranged upstream of the internal combustion engine (3) and is fluidically connected to the respective cylinders in order to supply the cylinders with inlet air, and an outlet duct (7), which is arranged downstream of the internal combustion engine (3) and is connected to the respective cylinders in order to discharge fluid, in particular exhaust gas, from the cylinders.

71. The engine system (1) according to embodiment 70, wherein the turbine (10) is arranged in the outlet duct (7), wherein, during operation, fluid is guided via the plurality of guide blades (200) to the turbine wheel (12), and wherein the compressor (50) is arranged in the inlet duct (6).

The invention claimed is:

1. A guide blade (200) for a guide device (100), comprising:
- a guide blade body (201) with a blade top side (210), a blade underside (220), a blade leading edge (230) and a blade trailing edge (240),
- a profile centerline (250) which is defined in a profile of the guide blade body (201) by the blade top side (210) and the blade underside (220) and runs between them from the blade leading edge (230) to the blade trailing edge (240), the profile centerline (250) having an inflection point (IP),
- wherein the blade leading edge (230) and the blade trailing edge (240) are connected by a profile chord (260),
- wherein the profile chord (260) forms in each case an intersecting point ($S_1$, $S_2$) with the blade leading edge (230) and the blade trailing edge (240), wherein a chord length (C) of the profile chord (260) is measured parallel to the profile chord (260) and between the intersecting points ($S_1$, $S_2$),
- wherein the profile chord (260) defines an X axis of a coordinate system (X, Y), wherein the X axis extends along the profile chord (260) and extends from the blade leading edge (230) to the blade trailing edge (240),
- wherein the guide blade (200) has a guide blade axis of rotation (PA), and
- wherein the axis of rotation (PA), starting from the blade leading edge (230) in the direction of the blade trailing edge (240), lies along the profile chord (260) between the blade leading edge (230) and the inflection point (IP),
- wherein the axis of rotation (PA) is located along the X axis at a position which meets the condition $0.20 \leq X_{PA}/C \leq 0.35$,
- wherein $X_{PA}$ is defined as the distance between the axis of rotation (PA) and the blade leading edge (230) along the X axis.

2. The guide blade (200) as claimed in claim 1, wherein the axis of rotation (PA) is located along the X axis at a position which meets the following condition:

$$0.23 \leq X_{PA}/C \leq 0.31.$$

3. The guide blade (200) as claimed in claim 1, wherein the inflection point (IP) is located along the X axis at a position which meets the following condition:

$$X_{PA} < X_{IP},$$

where $X_{IP}$ is defined as the distance between the inflection point (IP) and the blade leading edge (230) along the X axis.

4. The guide blade (200) as claimed in claim 1, wherein the inflection point (IP) is located along the X axis at a position which meets the following condition:

$$0.40 \leq X_{IP}/C \leq 0.45,$$

where $X_{IP}$ is defined as the distance between the inflection point (IP) and the blade leading edge (230) along the X axis.

5. The guide blade (200) as claimed in claim 1, wherein a distance ($X_A$) between the inflection point (IP) and the axis of rotation (PA) along the X axis meets the following condition:

$$0.05 \le X_A/C \le 0.25,$$

where $X_A$ is defined as the distance between the inflection point (IP) and the axis of rotation (PA) along the X axis.

6. The guide blade (200) as claimed in claim 1, wherein a distance ($X_A$) between the inflection point (IP) and the axis of rotation (PA) along the X axis meets the following condition:

$$0.09 \le X_A/C \le 0.20,$$

where $X_A$ is defined as the distance between the inflection point (IP) and the axis of rotation (PA) along the X axis.

7. The guide blade (200) as claimed in claim 1, wherein a Y axis of the coordinate system (X, Y) is defined orthogonally to the X axis and runs through an intersecting point of the profile chord (260) with the blade leading edge (230), wherein the inflection point (IP) is located along the Y axis at a position which meets the following condition:

$$0 \le Y_{IP},$$

where $Y_{IP}$ is defined as the distance between the inflection point (IP) and the profile chord (260) along the Y axis.

8. The guide blade (200) as claimed in claim 1, wherein the blade top side (210) and the blade underside (220) are designed such that the profile centerline (250) has an undulating form with the inflection point (IP), wherein the profile centerline (250) has a first curved region (251*a*) and a second curved region (251*b*), between which the inflection point (IP) is defined.

9. The guide blade (200) as claimed in claim 1, wherein the blade top side (210), starting from the blade leading edge (230) in the direction of the blade trailing edge (240) and with respect to the profile chord (260), has a concave portion (211*a*) followed by a convex portion (211*b*), and/or wherein the blade underside (220), starting from the blade leading edge (230) in the direction of the blade trailing edge (240) and with respect to the profile chord (260), has a convex portion (221*a*) followed by a concave portion (221*b*).

10. The guide blade (200) as claimed in claim 1, wherein the profile centerline (250) defines a first local extremum (E1) between the blade leading edge (230) and the inflection point (IP), and wherein the profile centerline (250) defines a second local extremum (E2) between the inflection point (IP) and the blade trailing edge (240), the first local extremum (E1) being a low point and the second local extremum (E2) being a high point.

11. The guide blade (200) as claimed in claim 1, wherein the profile centerline (250) defines a first local extremum (E1) between the blade leading edge (230) and the inflection point (IP), and wherein the profile centerline (250) defines a second local extremum (E2) between the inflection point (IP) and the blade trailing edge (240), the first local extremum (E1) being located with respect to the axis of rotation (PA) and the inflection point (IP) along the X axis at a position which meets the following condition:

$$X_{E1} < X_{PA} < X_{IP},$$

where $X_{E1}$ is defined as the distance between the first local extremum (E1) and the blade leading edge (230) along the X axis, and where $X_{IP}$ is defined as the distance between the inflection point (IP) and the blade leading edge (230) along the X axis.

12. The guide blade (200) as claimed in claim 1, wherein a Y axis of the coordinate system (X, Y) is defined orthogonally to the X axis and runs through an intersecting point of the profile chord (260) with the blade leading edge (230), wherein the axis of rotation (PA) is located along the Y axis at a position which meets the following condition:

$$Y_{PA} \le 0,$$

where $Y_{PA}$ is defined as the distance between the axis of rotation (PA) and the profile chord (260) along the Y axis.

13. A guide blade (200) for a guide device (100), comprising:

a guide blade body (201) with a blade top side (210), a blade underside (220), a blade leading edge (230) and a blade trailing edge (240), a profile centerline (250) which is defined in a profile of the guide blade body (201) by the blade top side (210) and the blade underside (220) and runs between them from the blade leading edge (230) to the blade trailing edge (240), the profile centerline (250) having an inflection point (IP), wherein the blade leading edge (230) and the blade trailing edge (240) are connected by a profile chord (260), wherein the profile chord (260) forms in each case an intersecting point ($S_1$, $S_2$) with the blade leading edge (230) and the blade trailing edge (240), and wherein the profile chord (260) defines an X axis of a coordinate system (X, Y), wherein the X axis extends along the profile chord (260) and extends from the blade leading edge (230) to the blade trailing edge (240), wherein the guide blade (200) has a guide blade axis of rotation (PA), wherein the axis of rotation (PA), starting from the blade leading edge (230) in the direction of the blade trailing edge (240), lies along the profile chord (260) between the blade leading edge (230) and the inflection point (IP), and wherein a Y axis of the coordinate system (X, Y) is defined orthogonally to the X axis and runs through the intersecting point ($S_1$) of the profile chord (260) with the blade leading edge (230), wherein the axis of rotation (PA) is located along the Y axis at a position which meets the following condition:

$$Y_{PA} \le 0,$$

wherein $Y_{PA}$ is defined as the distance between the axis of rotation (PA) and the profile chord (260) along the Y axis.

14. A guide blade (200) for a guide device (100), comprising:

a guide blade body (201) with a blade top side (210), a blade underside (220), a blade leading edge (230) and a blade trailing edge (240), a profile centerline (250) which is defined in a profile of the guide blade body (201) by the blade top side (210) and the blade underside (220) and runs between them from the blade leading edge (230) to the blade trailing edge (240), the profile centerline (250) having an inflection point (IP, wherein the blade leading edge (230) and the blade trailing edge (240) are connected by a profile chord (260), wherein the guide blade (200) has a guide blade axis of rotation (PA), and wherein the axis of rotation (PA), starting from the blade leading edge (230) in the direction of the blade trailing edge (240), lies along the profile chord (260) between the blade leading edge (230) and the inflection point (IP), wherein the profile chord (260) forms in each case an intersecting point ($S_1$, $S_2$) with the blade leading edge (230) and the blade trailing edge (240), and wherein the profile chord (260) defines an X axis of a coordinate system (X, Y), wherein the X axis extends along the profile chord (260) and extends from the blade leading edge (230) to the blade trailing edge (240), wherein a chord length (C) of the profile chord (260) is measured parallel to the profile chord (260) and between respective intersecting points ($S_1$, $S_2$) of the profile chord (260) with the blade leading edge (230) and the blade trailing edge (240), and wherein a Y axis of the coordinate system (X, Y) is defined orthogonally to the X axis and runs through the intersecting point ($S_1$) of the profile chord (260) with the blade leading edge (230), wherein the axis of rotation (PA) is located along the Y axis at a position which meets the following condition:

$$-0.005 \le Y_{PA}/C \le 0,$$

where $Y_{PA}$ is defined as the distance between the axis of rotation (PA) and the profile chord (260) along the Y axis.

15. A guide device (100), comprising:

a blade bearing ring (110), and at least one guide blade (200) as claimed in claim 1, wherein the at least one guide blade (200) is mounted via a blade shaft (270) rotatably and adjustable in the blade bearing ring (110).

16. The guide device (100) as claimed in claim 15, wherein the guide device (100) is a variable turbine geometry.

17. A turbine (10) for a supercharging device (2), comprising:

a turbine housing (11), a turbine wheel (12) which is arranged rotatably in the turbine housing (11), and a guiding device (100) as claimed in claim 15, which is arranged radially outside the turbine wheel (12) in the turbine housing (11) and circumferentially surrounds the turbine wheel (12).

18. A supercharging device (2) for an internal combustion engine (3) or a fuel cell, comprising:

a bearing housing (40), a shaft (30) which is mounted rotatably in the bearing housing (40), a compressor (50) with a compressor wheel (52), and a turbine (10) as claimed in claim 17, wherein the turbine wheel (12) and the compressor wheel (52) are coupled to the shaft (30) at opposite ends of the shaft (30) for conjoint rotation.

19. An engine system (1), comprising:

an internal combustion engine (3) with a plurality of cylinders, and a supercharging device (2) as claimed in claim 18, wherein the turbine (10) has a turbine housing (11), and wherein a turbine inlet (13) of the turbine housing (11) downstream of the internal combustion engine (3) is fluidically connected to the plurality of cylinders.

* * * * *